(12) United States Patent
Marocco

(10) Patent No.: US 11,105,149 B2
(45) Date of Patent: *Aug. 31, 2021

(54) ENCLOSED BLIND CONTROL WITH OPENING AND SLIDING MEMBER, AND PROFILE AND MULTIPLE SPROCKET

(71) Applicant: MAXXMAR INC., Toronto (CA)

(72) Inventor: Norbert Marocco, Toronto (CA)

(73) Assignee: MAXXMAR INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,993

(22) Filed: Sep. 22, 2017

(65) Prior Publication Data

US 2019/0093427 A1    Mar. 28, 2019

(51) Int. Cl.
| | | |
|---|---|---|
| *E06B 9/78* | (2006.01) | |
| *E06B 9/326* | (2006.01) | |
| *E06B 9/322* | (2006.01) | |
| *F16H 7/14* | (2006.01) | |
| *F16H 7/08* | (2006.01) | |

(52) U.S. Cl.
CPC ............... *E06B 9/78* (2013.01); *E06B 9/322* (2013.01); *E06B 9/326* (2013.01); *F16H 7/14* (2013.01); *E06B 2009/785* (2013.01); *F16H 2007/0806* (2013.01); *F16H 2007/0865* (2013.01); *F16H 2007/0891* (2013.01)

(58) Field of Classification Search
CPC ...... E06B 2009/785; E06B 9/32; E06B 9/326; E06B 9/76; E06B 2009/78; E06B 9/40; E06B 2009/3265; E06B 9/322; E06B 9/42; F16H 7/14

USPC ........................................................ 160/321
See application file for complete search history.

(56) References Cited

U.S. PATENT DOCUMENTS

| | | | |
|---|---|---|---|
| 537,351 A | | 4/1895 | Neuenschwander |
| 2,577,046 A | * | 12/1951 | Svirsky ..................... E06B 9/78 160/321 |
| 3,022,819 A | * | 2/1962 | Lampret ................ A47H 5/032 160/345 |
| 4,685,502 A | * | 8/1987 | Spangenberg .......... E06B 9/264 160/107 |
| 4,865,109 A | | 9/1989 | Sherman |
| 4,932,456 A | | 6/1990 | Buxbaum |
| (Continued) | | | |

FOREIGN PATENT DOCUMENTS

EP        24581128 A1    5/2012

OTHER PUBLICATIONS

Consumer Product Safety Commission, Four Children Killed by Window Covering Cords in Last Six Weeks, Consumer Federation of America Press Release, Dec. 22, 2016, Washington D.C.

(Continued)

*Primary Examiner* — Daniel P Cahn
(74) *Attorney, Agent, or Firm* — Eugene J. A. Gierczak; Miller Thomson LLP

(57) ABSTRACT

A blind having a blind operating mechanism and a blind control element and having an enclosure for the blind control element, with the element completely enclosed, a connector supporting the enclosure on the blind, and depending downwardly, and an opening disposed by the enclosure to permit access to the blind control element, and a closure to permit access to the opening in one position and bar access to the opening in a second position.

8 Claims, 33 Drawing Sheets

(56) References Cited

U.S. PATENT DOCUMENTS

| | | | | |
|---|---|---|---|---|
| 5,125,447 A * | 6/1992 | Suggs | A47H 5/032 | 160/320 |
| 5,465,775 A * | 11/1995 | Biba | E06B 9/306 | 160/168.1 R |
| 5,513,687 A * | 5/1996 | Tuzmen | E06B 9/326 | 160/168.1 R |
| 5,645,685 A * | 7/1997 | Furhman | E06B 9/306 | 160/168.1 R |
| 5,676,188 A * | 10/1997 | Cadorette | E06B 9/326 | 160/320 |
| 5,752,558 A * | 5/1998 | Lin | E06B 9/326 | 16/219 |
| 5,797,441 A | 8/1998 | Benthin | | |
| 5,845,696 A | 12/1998 | Chou | | |
| 6,085,824 A * | 7/2000 | Cadorette | E06B 9/326 | 160/177 V |
| 6,192,293 B1 | 2/2001 | Yamada et al. | | |
| 6,463,987 B1 * | 10/2002 | Nevins | E06B 9/32 | 160/173 R |
| 6,792,995 B2 * | 9/2004 | Judkins | E06B 9/326 | 160/173 R |
| 7,114,544 B2 * | 10/2006 | Rice | E06B 9/322 | 160/178.1 V |
| 7,353,857 B2 * | 4/2008 | Koop | E06B 9/324 | 160/178.1 R |
| 8,091,606 B2 * | 1/2012 | Nien | E06B 9/322 | 160/176.1 R |
| 8,286,686 B2 * | 10/2012 | Cannaverde | E06B 9/326 | 160/320 |
| 8,499,814 B2 * | 8/2013 | Ng | E06B 9/324 | 160/168.1 R |
| 8,499,815 B2 * | 8/2013 | Zhang | E06B 9/264 | 160/107 |
| 8,539,645 B2 * | 9/2013 | Marocco | A47H 3/08 | 160/178.1 R |
| 8,662,136 B2 * | 3/2014 | Nevins | F16G 11/00 | 160/173 R |
| 8,763,675 B2 | 7/2014 | Zhu | | |
| 8,950,463 B2 * | 2/2015 | Vestal | E06B 9/262 | 160/168.1 R |
| 8,967,226 B2 * | 3/2015 | Vestal | E06B 9/326 | 160/321 |
| 9,016,347 B2 | 4/2015 | Lin | | |
| 9,038,696 B2 | 5/2015 | Lava et al. | | |
| 9,506,290 B2 * | 11/2016 | Lin | E06B 9/76 | |
| 10,024,101 B2 * | 7/2018 | Kollman | E06B 9/32 | |
| 2004/0003900 A1 * | 1/2004 | Nien | E06B 9/32 | 160/168.1 R |
| 2009/0071610 A1 * | 3/2009 | Bossier | E06B 9/326 | 160/38 |
| 2010/0101741 A1 * | 4/2010 | Koop | E06B 9/78 | 160/321 |
| 2011/0168339 A1 * | 7/2011 | Bowen | E06B 9/40 | 160/268.1 |
| 2012/0097343 A1 * | 4/2012 | O'Hair | E06B 9/307 | 160/168.1 R |
| 2012/0160431 A1 * | 6/2012 | Cannaverde | E06B 9/326 | 160/340 |
| 2013/0068405 A1 * | 3/2013 | Lava | E06B 9/78 | 160/321 |
| 2013/0091968 A1 * | 4/2013 | Lin | F16H 7/08 | 74/89.21 |
| 2015/0252615 A1 | 9/2015 | Lava et al. | | |

OTHER PUBLICATIONS

Linda Kaiser, Parents for Window Blind Safety, letter dated Mar. 14, 2017, Barnhart, Missouri.

* cited by examiner

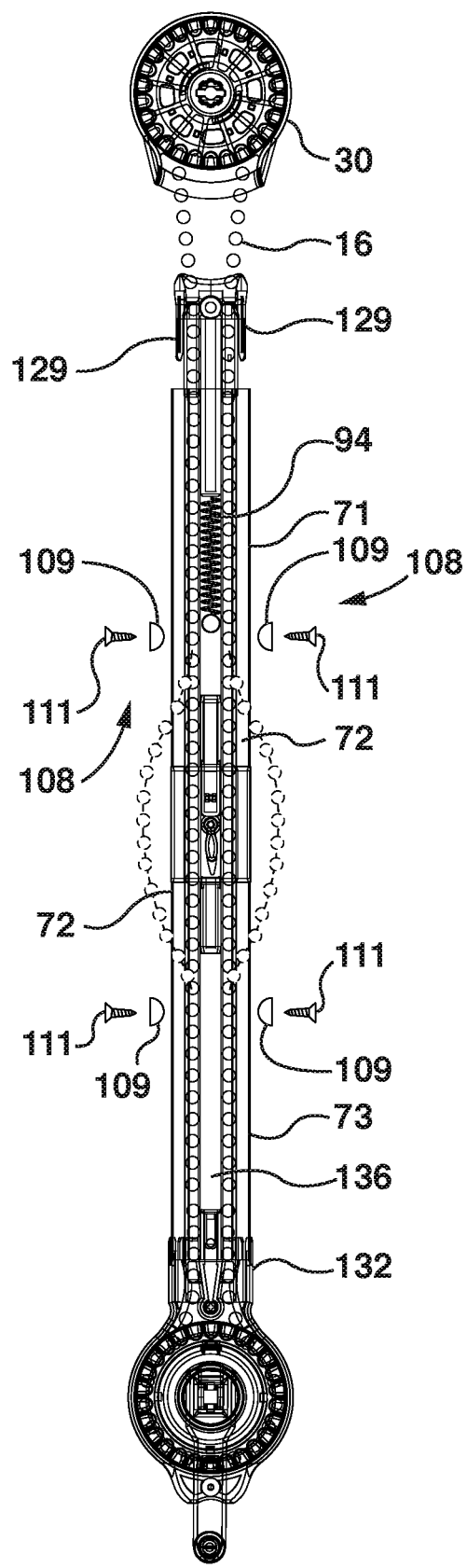
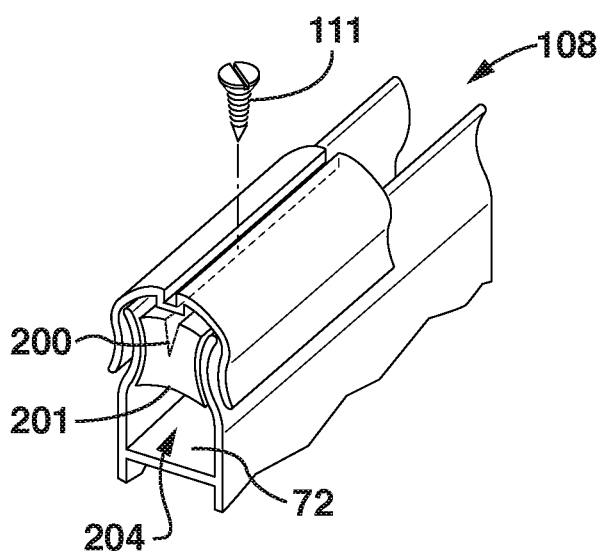
FIG. 23
FIG. 24

ENCLOSED BLIND CONTROL WITH OPENING AND SLIDING MEMBER, AND PROFILE AND MULTIPLE SPROCKET

This application is based on U.S. provisional application Ser. No. 62/430,668, title Enclosed Blind Control, inventor Norbert Marocco, filed Dec. 6, 2016, on U.S. patent application Ser. No. 15/447,955, title Enclosed Blind Control, inventor Norbert Marocco, filed Mar. 2, 2017 and on U.S. provisional application Ser. No. 62/468,121, title Enclosed Blind Control With Opening and Sliding Member, inventor Norbert Marocco, filed Mar. 7, 2017, the priority of which is claimed.

The invention relates to a blind having a blind control element and an enclosure for the blind control element preventing unsafe, or unwanted access to the blind control element, and providing a means for operating the blind control element

FIELD OF THE INVENTION

Background of The Invention

Blinds for building openings, eg windows, doors and the like, may be operated either simply down and up, in the case of eg. roller blinds, or in the case of eg. vertical shade panels, the vertical shade panels may be rotated open or closed.

The control elements for these blind operations are usually in the form of an endless cord or chain. The control element simply hangs down along one side of the building opening, in an endless loop.

Other forms of blinds and window coverings may also be operated by means of an endless control element hanging in a loop.

In the past this system has been widely used, and experience was believed to be mainly satisfactory. In some cases a pendant weight was located on the loop, to assist in controlling it.

U.S. Pat. No. 4,932,456, inventor G Buxbaum, shows the usual form of blind chain and drive sprocket gear on the blind roller such as being standard in the art.

However safety considerations for some time have been forcing Government agencies seek further ways to restrict unsafe or unwanted access to the endless loop type of control element. The intent of these considerations has been mainly to prevent any chance that the element, may possibly create a hazard to children, or handicapped persons, or even pets.

In addition, by guiding and controlling the loop of the element, its operation by anyone becomes somewhat easier. The element is prevented from becoming twisted, or entangled with any other blinds controls, curtains or the like.

A simple pulley, fixed to the building fabric, and holding the loop in tension, was proposed to achieve this result. However such a pulley may become dislodged or loosened from the building to which it was attached. The guide pulley will then hang loose on the loop of the element, leaving the element uncontrolled, as before.

This led to accidents and unsafe conditions.

In other cases the pulley might have been installed incorrectly.

In U.S. Pat. No. 8,539,645 Inventor Mario M Marocco, there is shown a form of lock for a blind cord loop control in which a spring operated lock is used.

One of the problems in simply attaching the lower end of the loop to a pulley, is that the pulley, in whatever form it took, was attached to the window frame.

This meant that the customer who wished to adjust the blind had to stand close to the window to reach the chain. This may have been an inconvenience to many.

To prevent unsafe conditions and accidents it is now proposed that the element will be enclosed, blocked or shielded. Also, while rendering the system safe, preferably, the entire control system should not be actually anchored at its lower end to the window frame.

It should be at least be somewhat moveable so that a customer could reach for the control without having to actually stand alongside the window.

U.S. Pat. No. 9,038,696, Aaron Lava, issued May 2015, shows a form of a rigid wand, holding the chain in tension, but otherwise the chain is fully exposed outside of the elongate or wand.

Adjustment of the chain was performed manually by simply grasping the chain exposed on one side or the other of the wand. This proposal still does not meet the problem of safety. Children, or even pets, could easily reach the chain exposed on each side of the wand.

A generally similar proposal is shown in U.S. Pat. No. 8,967,226, W D Vesta, issued Mar. 3, 2015. This proposal describes a rigid wand with pulleys top and bottom. The chain is substantially exposed along each side of the wand. It would not satisfy the requirements for safety.

Other arrangements are shown in U.S. Pat. Nos. 3,022,819, 5,752,558, 4,865,109, 6,192,293, 5,797,441, 5,845,696, 4,865,109

BRIEF SUMMARY OF THE INVENTION

With a view to providing a more effective, and aesthetically appealing solution to these problems, the invention provides a blind operated by at least one flexible blind control element, and a driven sprocket connected to the blind and having a safety enclosure for the blind control element, in which the element is enclosed, blocked or shielded, a support for the upper end of the enclosure allowing it to depend downwardly alongside the blind, and a drive system on the lower end of the enclosure operable to move the element within the enclosure and thus drive the driven sprocket.

Preferably the invention provides a blind operated by at least one safety blind control element, in which the enclosure is in the form of a tube with the element running inside the tube.

The invention also provides a blind operated by at least one safety blind control element in which the enclosure consists of a channel and a separate closure for the channel.

Preferably the invention provides a blind operated by at least one safety blind control element and in which the drive system is a rotary driver such as a spool or sprocket with a handle or other drive means by which the rotary driver can be rotated, and in which the handle can be placed on one or other of the opposite sides of the drum.

Alternatively there may be simple holes or recesses in the driver to permit it to be moved by the fingers, or a simple tool such as a pencil, for example, or even some form of motorised drive such as an electric motor.

Preferably the invention provides a blind operated by at least one safety blind control element and in which the enclosure is attached to the blind by a flexible support, enabling the enclosure to be swung away from the blind, for access.

The enclosure can also be attached to the window or building, if that is preferred, or even simply left free to hang from the blind itself, or the element.

Preferably the invention provides a blind operated by at least one safety blind control element which is formed with element guides at its upper and lower ends.

There may be a separate winding handle for the rotary driver. The handle may be attached to one side or to the other, and may have an extension extending radially out to provide greater mechanical advantage.

It is also possible to provide a small drive motor, operated by a battery, so that moving the safety blind control element can be done at the push of a button, or even by means of a remote.

The drive motor can be a small hand held appliance with a simple rotary drive head, eg a square or other shaft. The rotary driver can have a sleeve or socket designed to receive the drive head of the motor. In this way the one motor drive can be used to operate several different blinds.

In one embodiment the enclosure for the element can consist of channels for receiving the two lengths of the element loop. The two channels can be open, along either side of the enclosure so as to shield, block or bar access to the endless loop blind control element. This can enable the homeowner to grasp the element itself, to adjust the blind, instead of using the rotary driver at the lower end of the enclosure.

The enclosure may also be spring loaded, so as to apply continuous tension to the element loop, while allowing part of the element to be manipulated.

The invention also provides for a homeowner seeking to update existing old technology blinds, the facility to buy components and retrofit them to an existing blind.

It is another aspect of this invention to provide a safety device for an endless loop blind control element operating a blind operating mechanism comprising; an enclosure for the endless loop blind control element, the enclosure having at least one channel for receiving and inhibiting access to the endless loop blind control element; biasing structure such as springs disposed in the enclosure for urging opposite ends of the endless loop blind control element away from each other; and a drive device carried by the enclosure for connecting the endless loop blind control element to the blind operating mechanism.

In another embodiment the safety device includes at least one channel disposed on an external surface of the enclosure for receiving and inhibiting access to a portion of the endless loop blind control element.

In another embodiment the safety device includes a pair of spaced channels disposed on the external surface of the enclosure, each channel receiving and inhibiting access to a portion of the endless loop blind control element respectively.

Also the enclosure of the safety device has a first end and a second end wherein the first end is pivotally connected to the operating mechanism for movement of the enclosure relative the operating mechanism about a first axis. In another preferred embodiment the first end is pivotally connected to the operating mechanism for movement of the enclosure relative the operating mechanism about a second axis substantially perpendicular to the first axis.

It is another aspect of the invention to provide a blind having a blind operating mechanism and an endless loop blind control element for operating the blind mechanism and comprising; an enclosure for the blind control element, with the element enclosed within it, the enclosure defining an upper end and a lower end; a connector supporting the upper end of the enclosure adjacent to the blind operating mechanism and depending downwardly from it; and said enclosure including an opening into the enclosure to access the endless loop blind control element blind to operate the blind mechanism.

In one embodiment the blind includes closure means for closing said opening in a first position and permitting access to said opening in a second position. The closure means comprises a sliding sleeve or sliding member. Alternatively, the closure means can comprise a hinged or swinging closure member. In yet another embodiment the enclosure includes guiding means presented by an exterior surface to slidingly receive the closure or sliding member.

It is a further aspect of the invention to provide a safety device for an endless loop blind control element operating a blind operating mechanism comprising; an enclosure for the endless loop blind control element, the enclosure having at least one pair of spaced sliding members for inhibiting access to a portion of the endless loop blind control element.

In yet another embodiment of the invention the safety device comprising at least one groove disposed on an external surface of the enclosure for receiving a portion of the endless loop blind control element.

In another embodiment of the invention the safety device comprising a pair of spaced grooves disposed on the external surface of the enclosure, each groove receiving a portion of the endless loop blind control element respectively.

A further aspect of this invention relates to a safety device for an endless loop blind control element opening a blind opening mechanism comprising: an enclosure for the endless loop blind control element, the enclosure having guide means; and a closure means received by said guide means to move from a first position to permit access to an opening to said endless loop blind control element and a second closed position to block access to said opening.

Yet another aspect of this invention relates to a blind having a blind operating mechanism and an endless loop blind control element for operating the blind mechanism and comprising; an enclosure for the blind control element, with the element enclosed within it, the enclosure defining an upper end and a lower end; a connector supporting the upper end of the enclosure adjacent to the blind operating mechanism and depending downwardly from it; and a fastener extending through said enclosure in the vicinity of said upper end for fastening said enclosure to a wall or window frame with a gap between said enclosure and wall or window frame.

In one embodiment the upper end of said enclosure includes a hole therethrough which is larger in size than said fastener to permit said enclosure to be manipulated in multiple directions relative the wall or window frame.

In another embodiment the hole includes a sleeve longer than a width of said enclosure for receiving said fastener to permit said enclosure to be manipulated in multiple directions relative the wall or window frame.

Another aspect of this invention relates to producing an enclosure having an upper end and a lower end for a blind having a blind operating mechanism and an endless loop blind control element for operating the blind mechanism at said upper end and a rotatable drive device on the lower end comprising; inserting a length of blind control element through one of said ends of said enclosure; looping said length of said blind control element about one of said blind mechanism or rotatable drive device; connecting the ends of said length of blind control element and looping said connected ends about said other one of said blind mechanism or rotatable drive device.

Another aspect relates to a hollow enclosure that has two spaced partition walls therein and said loop blind control element is disposed between said partition walls and two opposite sides of the enclosure respectively.

In one embodiment the sides of enclosure include slots.

In another embodiment one of said slots in one of said sides is bigger than said other slot on said other side.

A further aspect of this invention relates to a blind having a blind operating mechanism and an endless loop blind control element for operating the blind mechanism and comprising; an enclosure for the blind control element, with the element enclosed within it, the enclosure defining an upper end and a lower end; a connector supporting the upper end of the enclosure adjacent to the blind operating mechanism and depending downwardly from it; and sprocket structure in the vicinity of the upper end for engaging the endless loop blind control element.

In one embodiment the sprocket structure comprises a sprocket in the vicinity of said upper end of the enclosure engages the endless loop blind control element.

In another embodiment the sprocket structure comprising a pair of spaced sprockets where one of said sprockets engages a first loop blind control element and the second sprocket engages a second loop blind control element.

In yet another embodiment of the invention the sprocket structure comprises a plurality of said pair of spaced sprockets along the length of said enclosure The various features of novelty which characterizes the invention are pointed out with more particularity in the claims annexed to and forming a part of this disclosure.

For a better understanding of the invention, its operating advantages and specific objects attained by its use, reference should be made to the accompanying drawings and descriptive matter in which there are illustrated and described preferred embodiments of the invention.

IN THE DRAWINGS

FIG. 23 is a partial exploded view of another embodiment showing slideable stoppers;

FIG. 24 shows an embodiment of the slideable stoppers;

FIGS. 32a, 32b, 32c, 32d, and 32e illustrate other embodiments of the invention having a fastener for fastening the enclosure or wand to dry wall or window frame.

Figure 25:
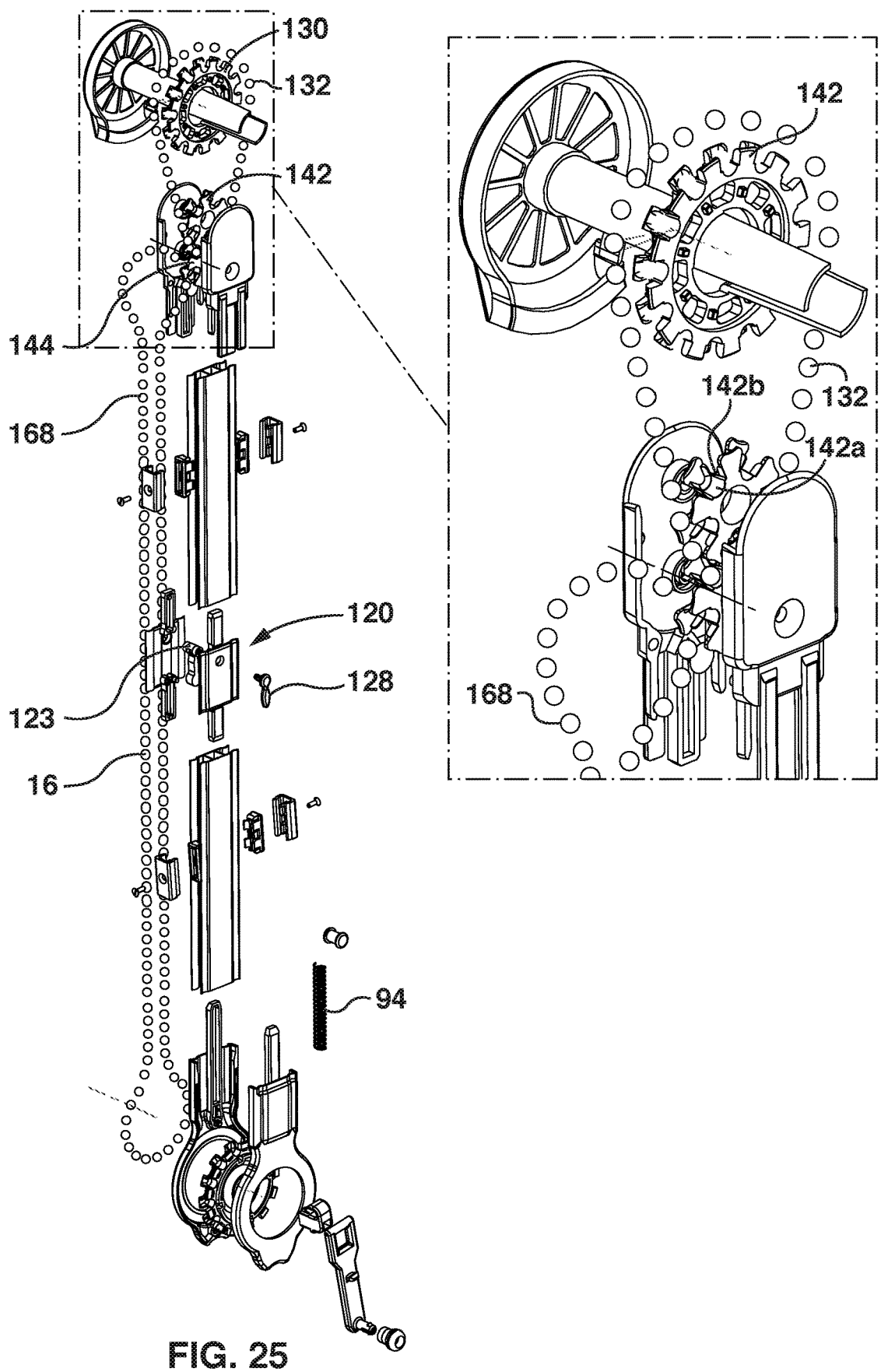
FIG. 25 is an exploded view of another embodiment of the invention, with an enlarged exploded view of the sprocket.
Figure 33:
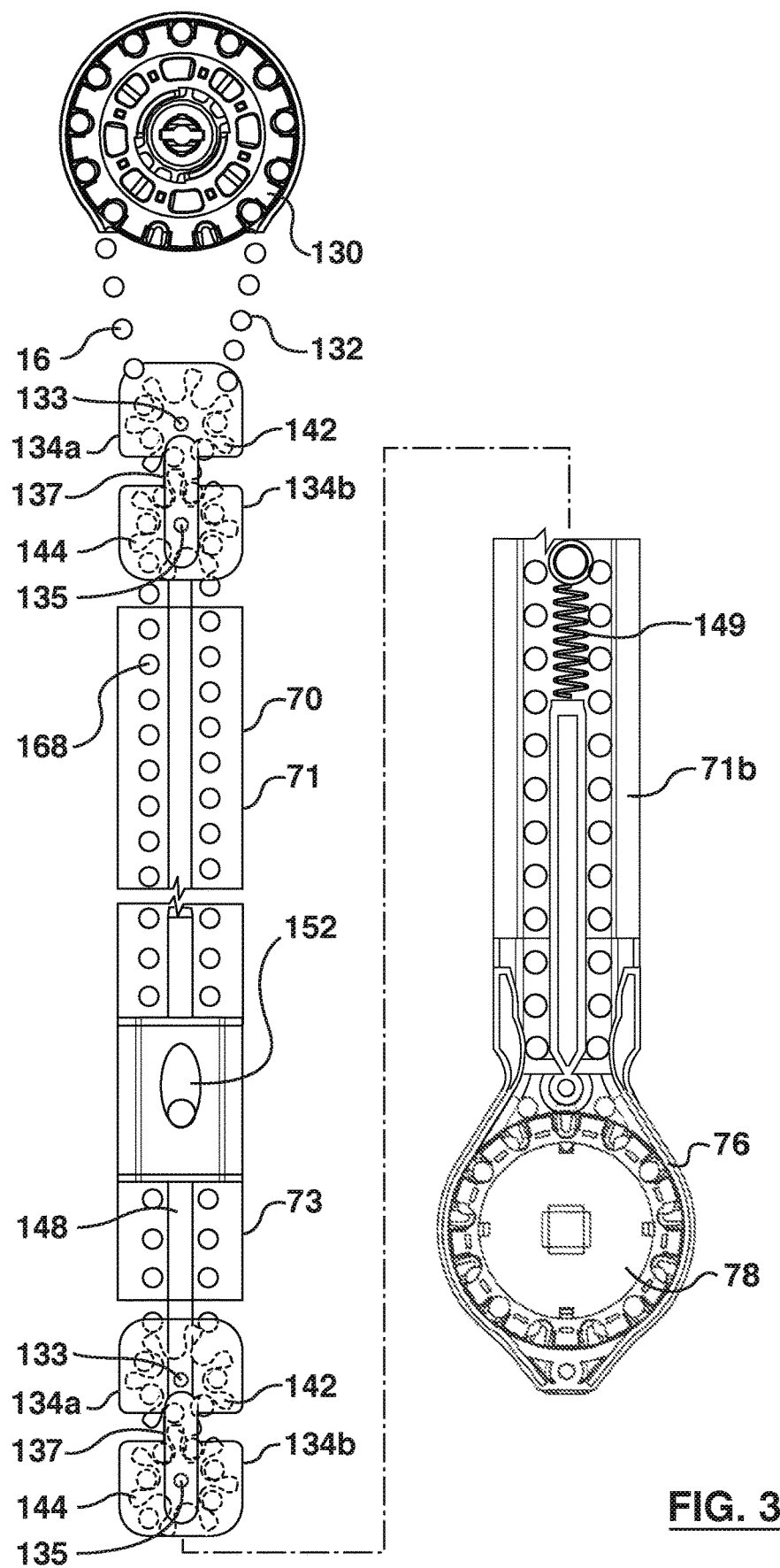

FIG. 33 is similar to FIG. 25 but includes another set of two sprockets when an extended length of wand is required.

Figure 34:
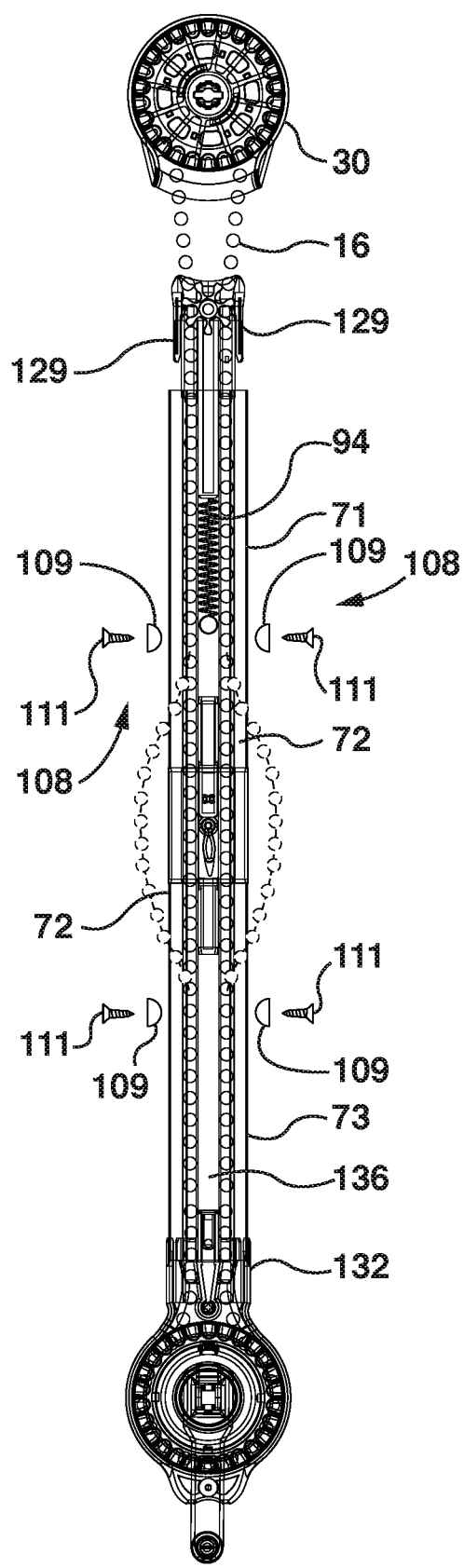

FIG. 34 is similar to FIG. 23 but has a sprocket at the upper end of the enclosure.

DETAILED DESCRIPTION OF THE INVENTION

Figure 1:
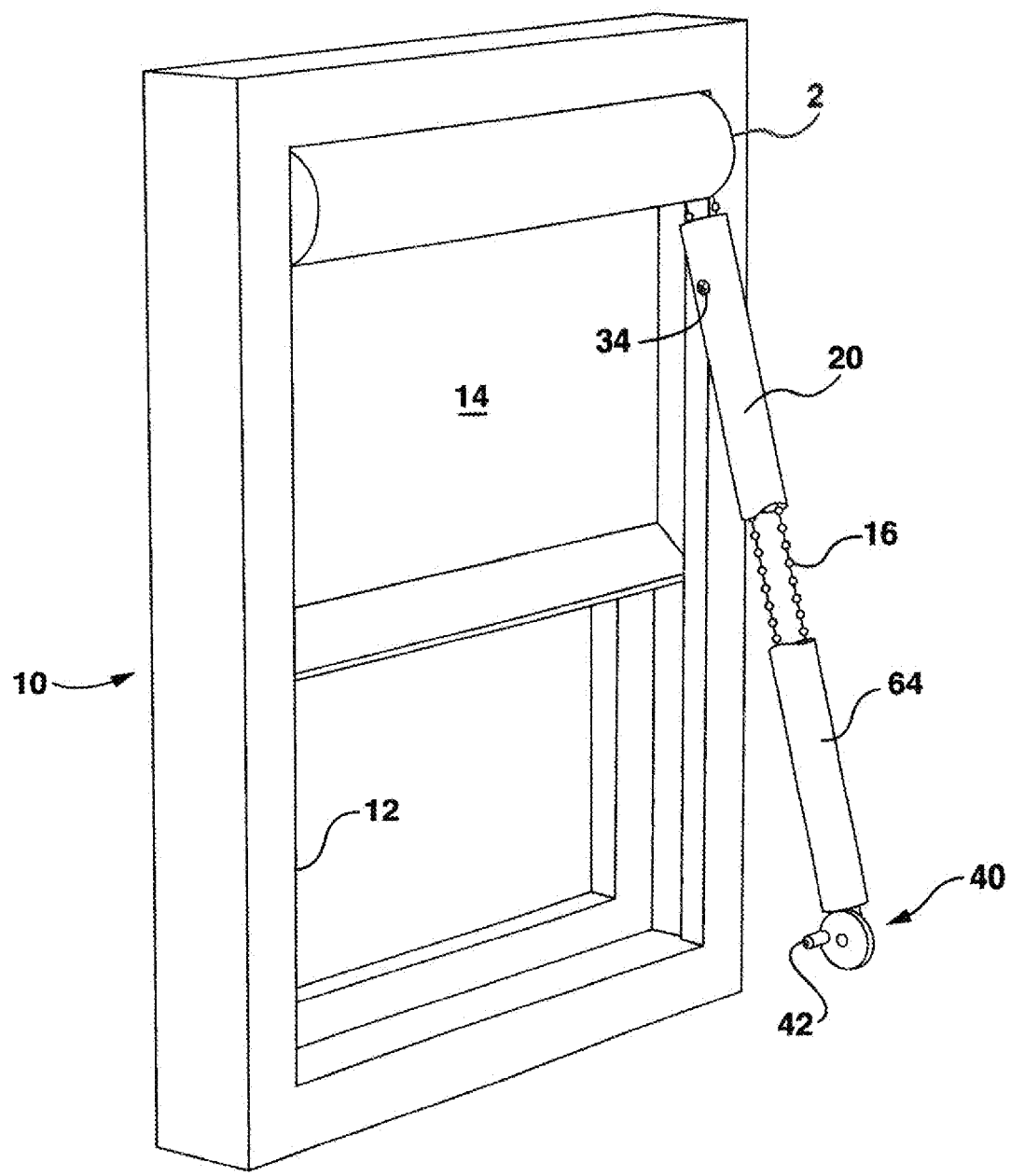
FIG. 1 is a perspective of a typical window with a simple roller blind installed with a safety blind control element, and illustrating the blind control element enclosure with a cut out view showing with safety blind control element.

Referring first to FIG. 1, it will be seen that a simple window, 10 representing a building opening, has a typical border frame 12. A simple roller blind 14 is shown mounted on the frame. The blind, in this example, is a sheet of suitable material wound onto a roller, from which the sheet or blind may be lowered and raised. The roller is operated, in this case, by a safety blind control element 16. The element, in this example is shown as the typical chain type of element, with a series of balls 18 connected by wire or other filament material, in an endless chain. This element runs around a well known form of sprocket gear drive (not shown) in the mechanism of the blind 14.

There will usually be some form of clutch (not shown) associated with the blind. This purpose is to prevent the blind from unwinding on its own.

Such features are very well known in the industry and require no illustration.

As is usual the element 16 is an endless loop. Pulling one side of the loop will lower the blind and pulling the other side of the loop will raise it.

The roller blind shown is merely by way of example. Various forms of blind employ the continuous loop type of blind control element. The invention is applicable to most of them and is not confined solely to the roller blind shown. For example endless loop controls are used in venetian blinds and in vertical blinds, and in Russians, and balloons, to name only some of the more popular types of blinds and window coverings.

The blind control element, in other cases, may be a continuous length of cord, driving the blind through a different form of a drive mechanism (not shown) well known in the art.

The invention is equally applicable to a variety of forms of a blind control element, other than those described. Chains of various constructions, and drive belts, and drive cords, for example, also use the endless loop form of element control.

As explained the endless loop type of blind control element has been in use for very many years.

Building requirements are constantly being reviewed both by governmental building authorities, and the industry both to reduce hazards, and to eliminate accidents to children in particular.

It is now proposed that the loop type of blind control element shall not only be held in tension, but also that the loop of the blind control element shall be enclosed along its length, from the blind, at its upper extremity, down to its lower extremity.

This feature will greatly improve both convenience and safety since a child cannot become entangled in it, but it does pose some problems in execution.

The enclosing of the element should not make it more difficult to access the element for operation of the blind.

On the contrary, it should preferably make the element somewhat easier to operate, by preventing the element from becoming twisted or entangled with itself, or any other blind operating elements, which may be part of a more complex blind system (not shown), such as, for example, a vertical panel blind system, or a Venetian blind system.

Figure 5:
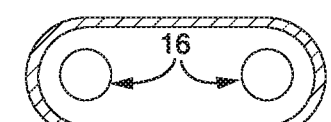
FIG. 5 is a section of the tubular form of enclosure.
Figure 6:
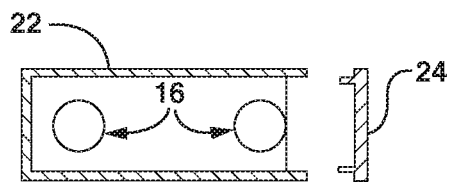
FIG. 6 is a section of a channel form of the enclosure.

For this purpose the invention, in this embodiment, provides a safety device or tubular enclosure 20 (FIGS. 1, 5 and 6) through which the blind control element 16 passes. The tube may be a complete tube, typically of extruded thermoplastic, or any other suitable material, such as aluminum, (FIG. 5), or it may be in the form of a channel or channels, such as a three-side channel 22 (FIG. 6), having a separate closure strip 24, which can be snap fitted, by friction into the open side of the channel 22.

Figures 9A, 9B, 9C:
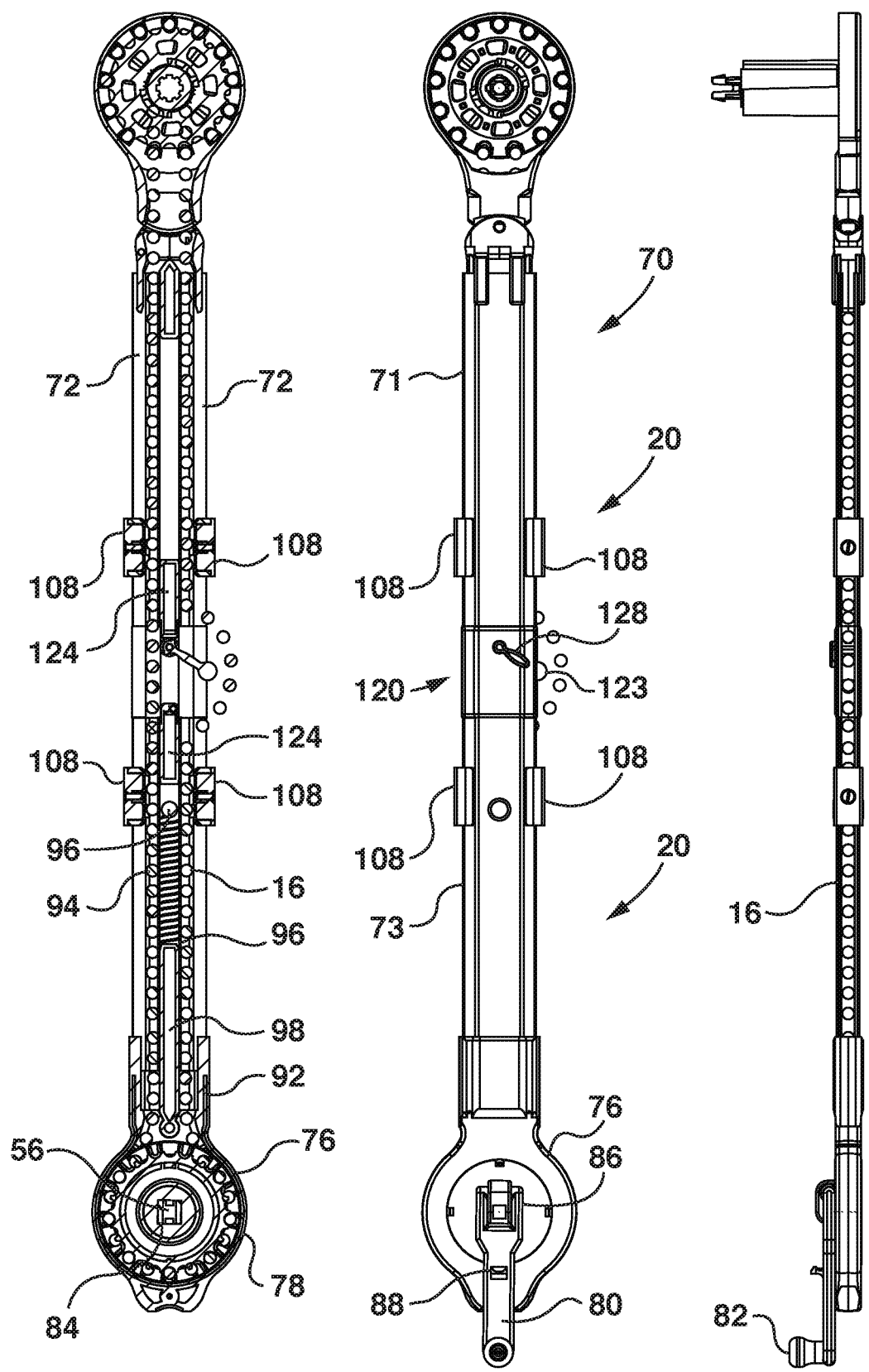
FIG. 9a, 9b, 9c, illustrate yet another embodiment.
Figure 10:
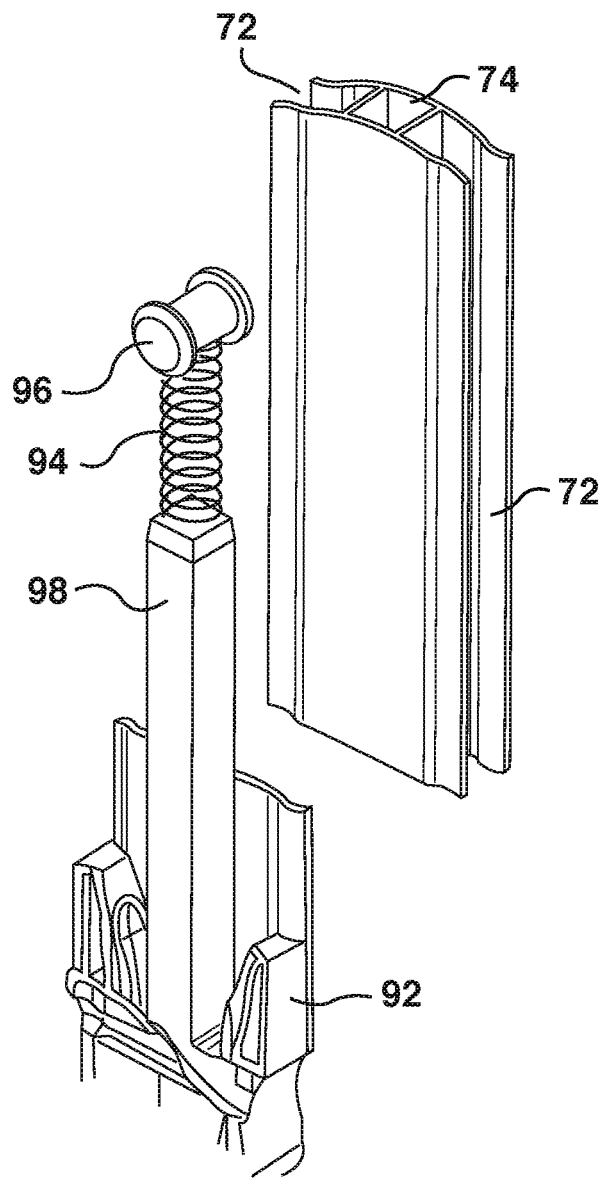
FIG. 10 is a perspective of a portion of the wand of FIGS. 9a, 9b, 9c.

The enclosure can also be made in two or more sections. In one embodiment (FIG. 16) the sections are telescopic and thus avoid cutting the sections to length. In other embodiments the sections can be connected by connector member 122, or other connector means as shown in FIG. 9a or 17 for example. This makes it easy for customers to "build" or order from the manufacturer the safety device 20 to any length if for example they have a ten foot high window by adding several lengths of sections with the appropriate connectors.

Figure 2:
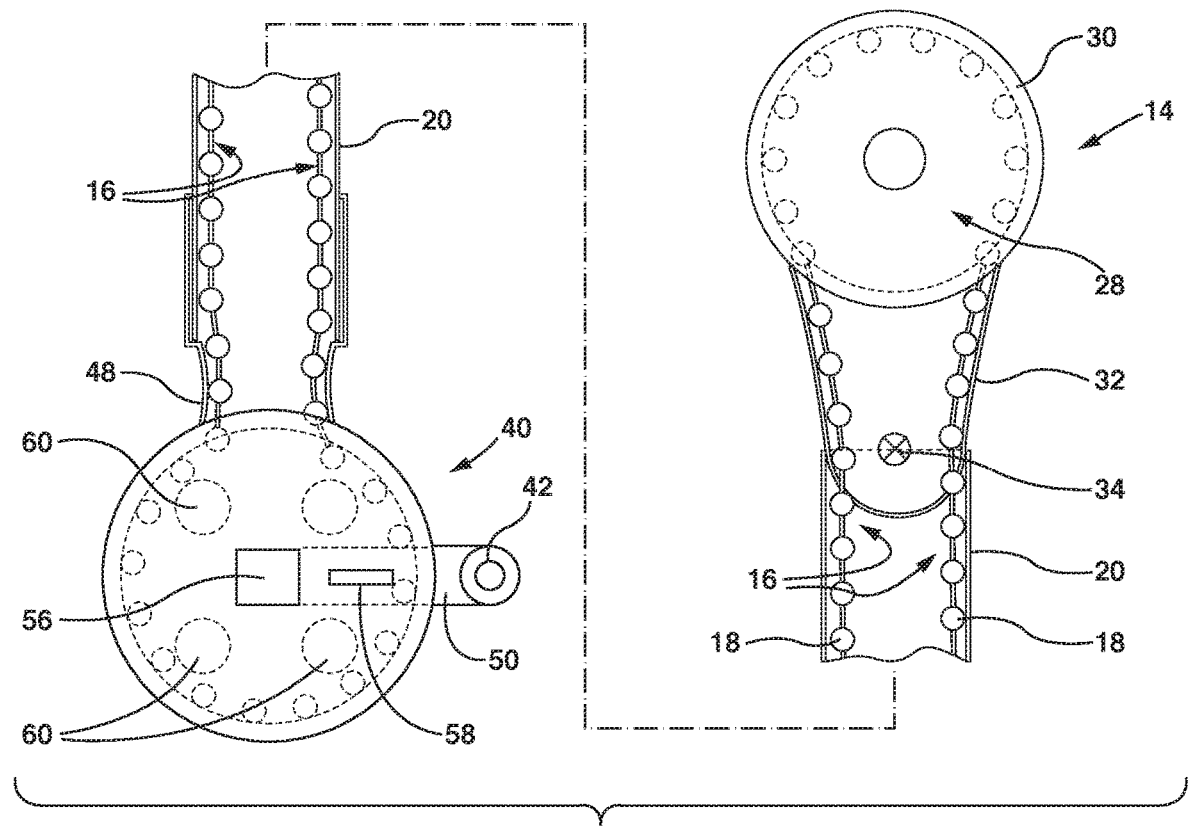
FIG. 2 is an exploded elevation view of the safety blind control element enclosure and operating device.

As is usual in this type of blind 14, a blind sprocket 28 is located at one end of the blind itself, in a housing 30. In this case the housing has a downwardly directed neck 32, curved and contoured to ensure smooth guided movement of the element 16 from the sprocket 28, into the safety device or enclosure 20. Usually the sprocket 28 or other control is coupled with some form of clutch (not shown) or brake system, which holds the blind in a desired position, and prevents the blind from unwinding due to gravity. The neck 32 is curved and contoured to present converging sides as shown in FIG. 2 thereby presenting a more compact device in profile.

The upper end of the safety device enclosure 20 is attached in this example by a fastener 34. The fastener 34 holds the end of the safety device or enclosure 20 to the neck of the housing 30 but permits the safety device or enclosure 20 to be swung away from the window as the enclosure 20 is fastened to the inside surface of the frame 12 by fastened 34. This provides a degree of convenience to the customer which might not have been available in previous forms of pulley systems for the element 16.

At the lower end of the safety device or enclosure 20 there is a drive device, 40 for operating the element 16.

The drive device 40 is shown as having features capable of engaging the element 16, typically being a somewhat larger diameter sprocket. In this example the device 40 is another sprocket, suitable for rotatably driving the chain type of element 16 shown. Other forms of an engagement feature are possible for different forms of a control element. The drive device 40 in this case, is provided with a winding knob 42. This knob can be attached on either the right side or the left side of the drive device, depending on the location of the blind, and the preferences of the customer.

A housing 46 with suitable guide walls 48 is provided to guide the element 16 freely from the enclosure 20 onto the drive device 40. The housing would be made in two parts, so that the element can be fitted around the sprocket, and then secured by attaching the housing parts together.

Figure 7:
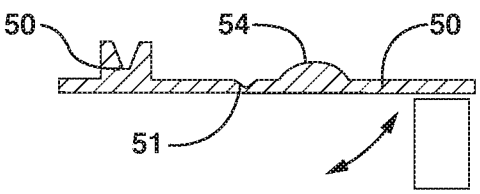
FIG. 7 is a schematic side elevation of one form of winding handle.

Numerous refinements can be added. For example, the knob 42 may be mounted on a radial arm 50 extending away from the drive device, to provide somewhat greater mechanical advantage for the customer. The arm could be hinged at 51 so as to be stowable onto the drive drum, when not in use (FIG. 7).

The arm 50 has a central hub body 52 and an abutment 54 engageable in suitable recesses 56 and 58 in the drive device, (FIG. 2).

The drive device 40 can also be provided with finger recesses or even holes 60, for operation by the fingers, or a suitable simple tool, even a pencil, for example.

Figure 3:
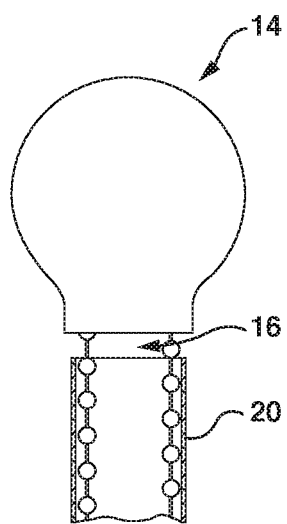
FIG. 3 is a schematic elevation of the upper end of the enclosure, showing one form of attachment.

Depending on customer preferences, the upper end of the enclosure 20 can possibly be left free of attachment to the blind (FIG. 3 and FIG. 4—showing different spacing from the blind 14), so that it hangs down supported only by the chain element 16.

Figure 4:
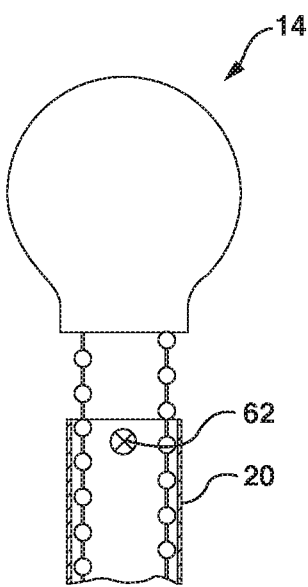
FIG. 4 is a schematic elevation of the upper end of the enclosure, showing another form of attachment.

Alternatively the upper end of the enclosure 20 can be left somewhat short of the blind itself, and can simply be attached to the window frame 12 by a screw 62 (FIG. 4). Such a screw fastening could also be provided at various positions along the length of the enclosure.

Figure 11:
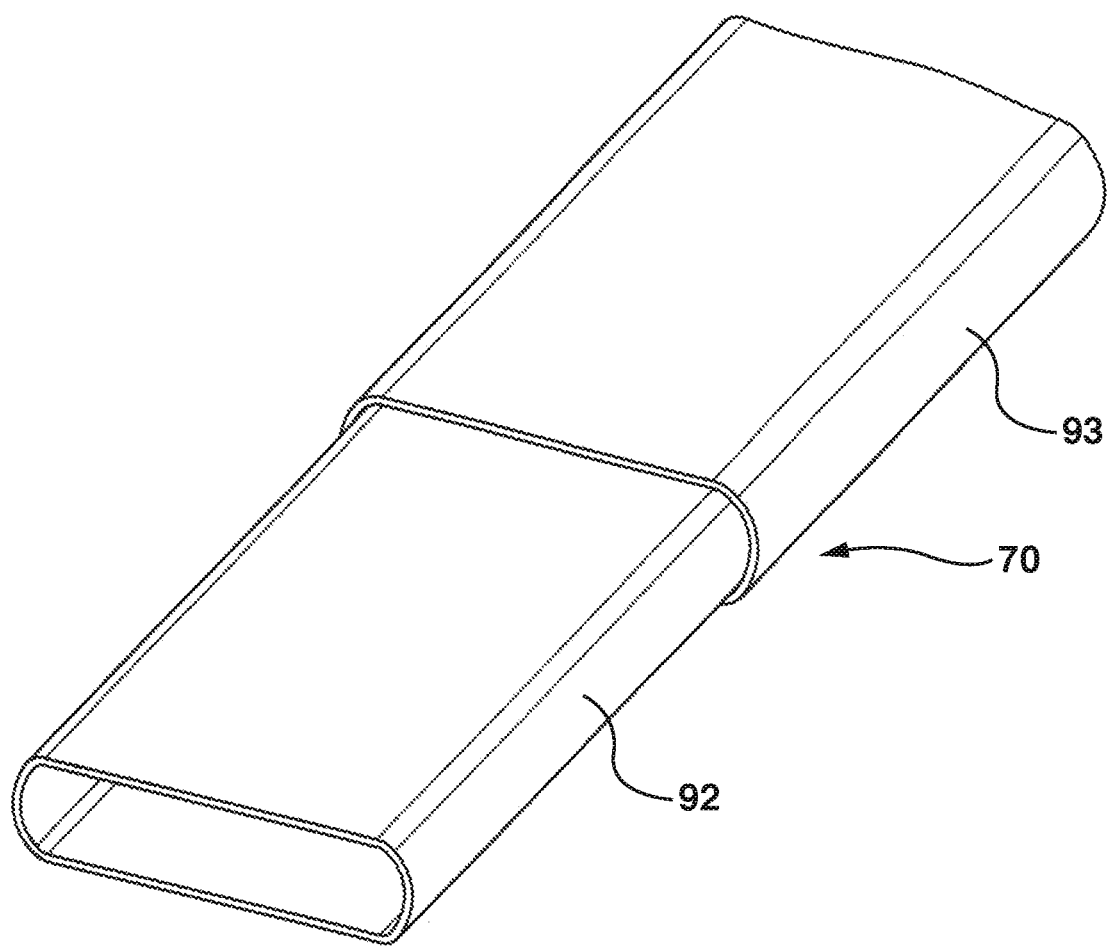
FIG. 11 is a cut away perspective of a telescopic form of enclosure
Figure 16:
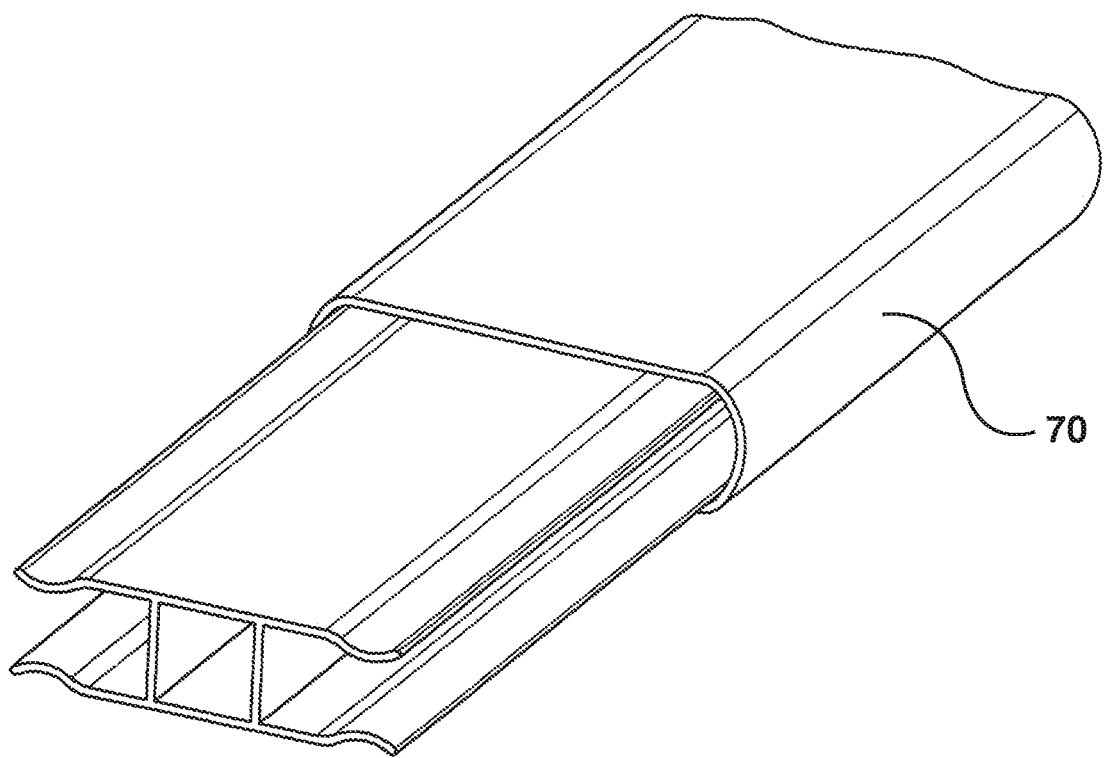
FIG. 16 is a cut away perspective of an alternate embodiment of a telescopic form of enclosure.
Figure 17:
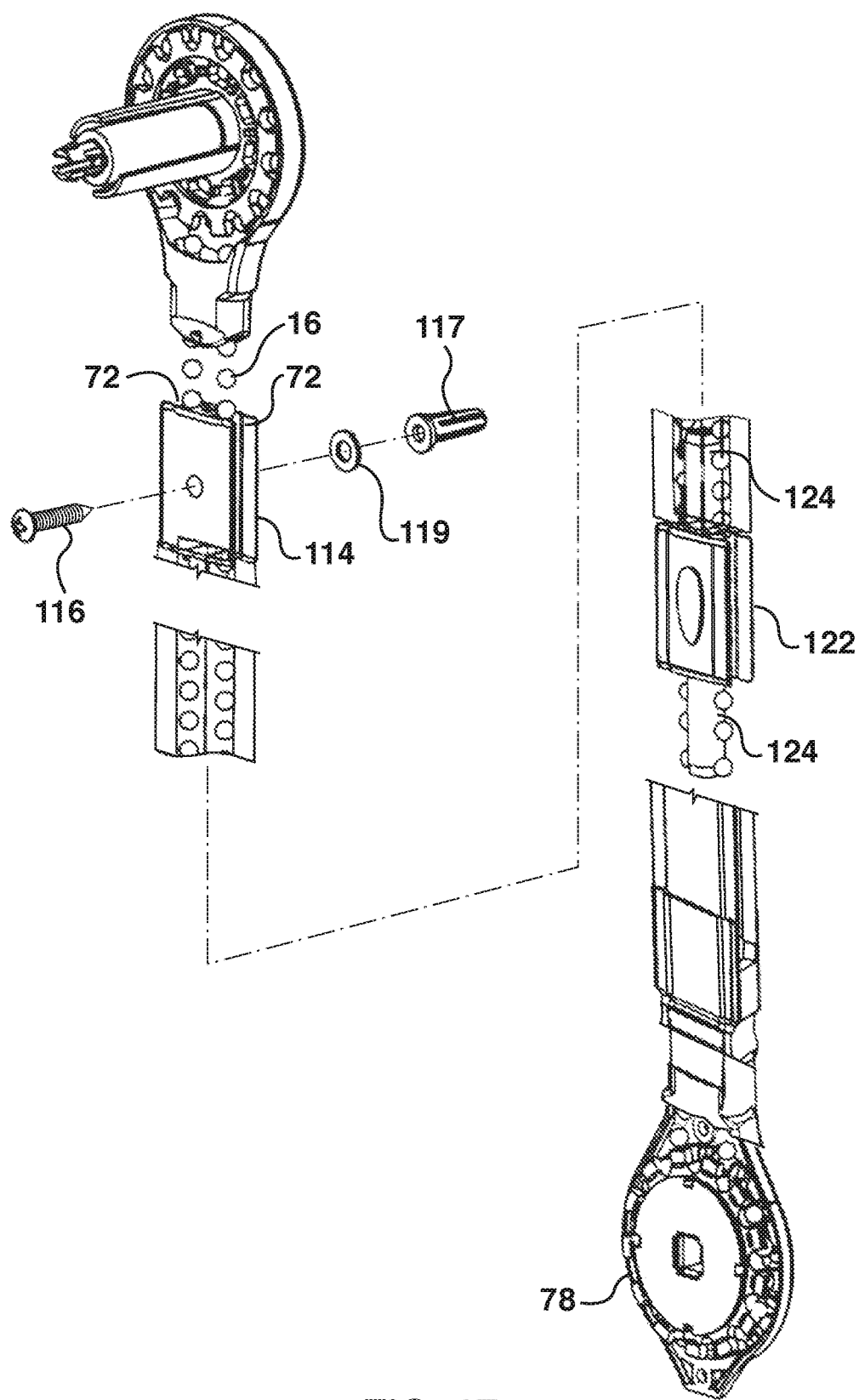
FIG. 17 is a cut away perspective of another embodiment.

The safety device or enclosure 20 may be one piece from end to end, or, if desired, it may be made in two or even more, parts connected as at 64 (FIG. 1) or telescopic as shown and in more detail in FIG. 11 or 16 so as to be adjustable, for various different applications.

In another embodiment shown in FIG. 11 the wand 70 comprises two sliding sleeves 92 and 93.

The sleeves provide a sliding telescopic joint.

This may assist a purchaser who wishes to purchase just the safety device or enclosure 20 and a drive device 40, and retro fit it to an existing old technology blind having the usual form of dangling endless loop control.

Figure 13:
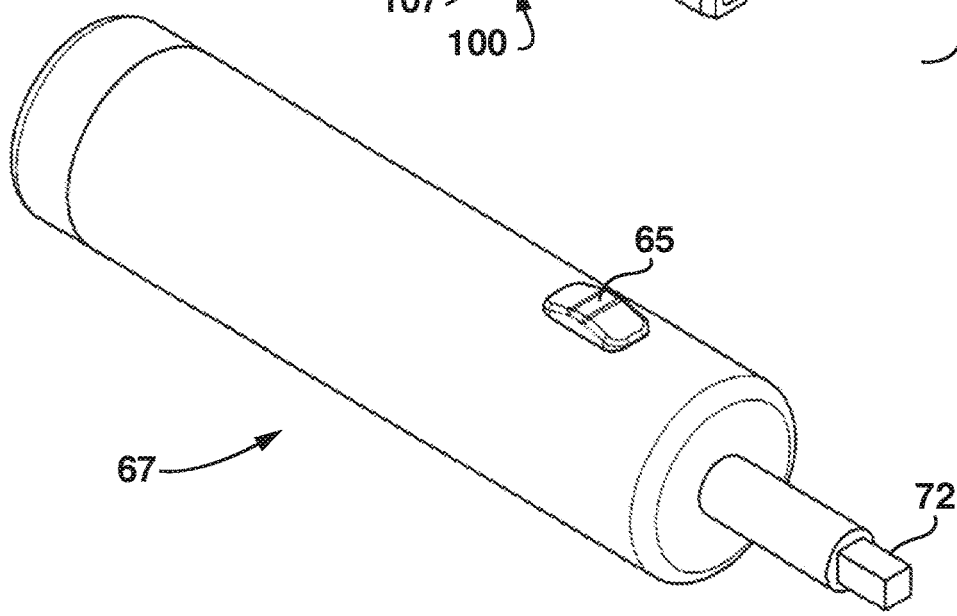
FIG. 13 is a perspective of an electric powered hand tool for the blind control.

It is also possible to provide a small drive motor 67, FIG. 13. The drive motor includes having a male extension 72 that fits into a corresponding female socket 56, operated by a battery, so that moving the blind control element 16 can be done at the push of a button, or even by means of a remote (not shown).

Other embodiment are shown in FIGS. 8a, 8b, 8c, 8e, 8e, 8f, 9a, 9b, 9c, 10 11, and 12.

Figure 12:
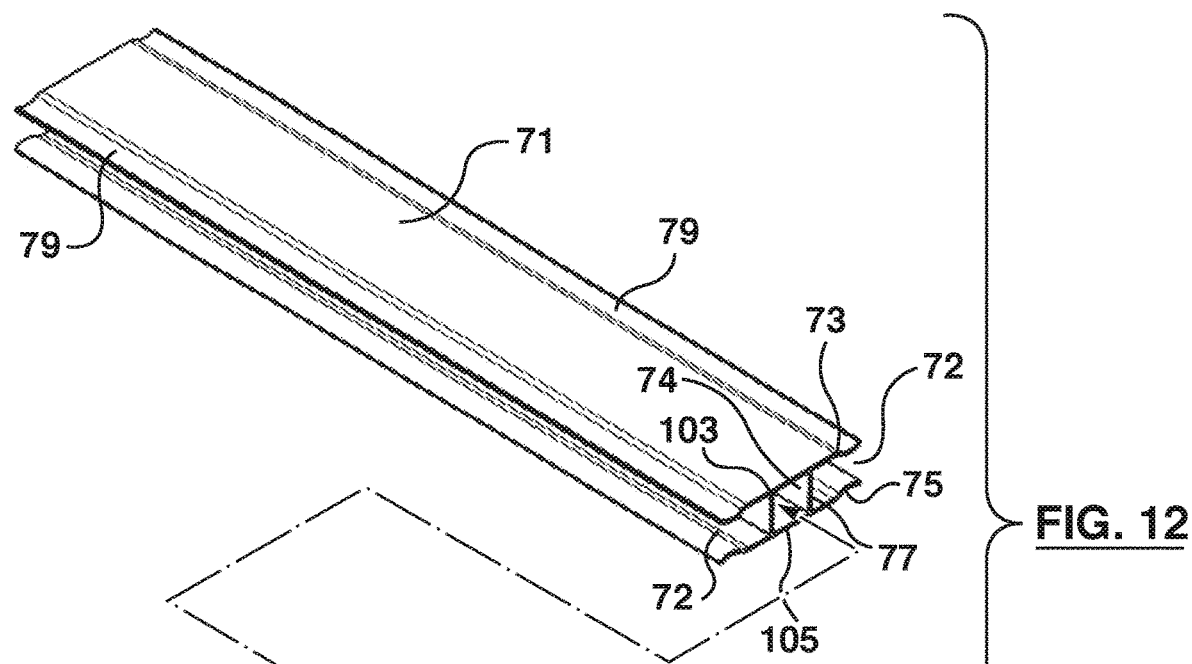
FIG. 12 is an exploded perspective of the joint feature of FIGS. 8a, 8b, 8c, 8d, 8f.
Figure 12:
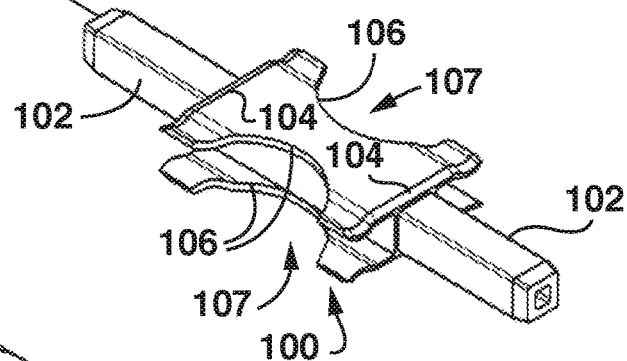

FIG. 8a, 8b, 8c, 8d, 8e, 8f, and FIG. 12 show an embodiment where the safety device or enclosure 20 is in the form of a flattened wand 70, see also FIGS. 10, 11, 12, and 20a, 20b, 20c, 20d. As best seen in FIG. 12 the wand 70 generally has an "H" shaped cross section, having on either side edge respective restricted open channels 72 and 72 defined by side walls 73, 75, and 77. These channel side walls 73 and 75 are shaped with shallow concave curvature 79 as shown, to receive the element 16 and restrict, block, shield or partially enclose and hold the element 16 in place. The size or diameter of the "balls" of the element closely approximate the distance between the walls 73 and 75 so that the element 16 snugly fits within the recess or channels 72. In another embodiment the size or diameter of the "balls" of the element 16 closely approximate the distance between the shallow concave curvatures 73 and 75 so that the element 16 easily fits into the cannels but bars access to, or inhibits the removal of the elements. Other types of elements such as rope, wire can be used with suitable adjustment to the spacing of the channels in accordance with the teachings of the invention herein. The size or diameter of the balls in element 16 are smaller than the depth of the walls 73 and 75 so as to make it difficult for a child to pry out of the element from the enclosure.

The wand 70 is comprised of a first or upper wand section 71 and a second or lower wand section 73 connected by a connector body 100.

Body 100 has upper and lower struts 102 extending from the connector body 100 into the tubes 74 of the upper 71 and lower 73 portions of the wand 70. In this way the struts 102 act as a form of splint holding all three components together. The connector body 100 is formed at each end with shoulders 104 mating with the lateral sides 103, 105 of the channels 72 on opposite side edges of the wand 70.

Figure 8A:
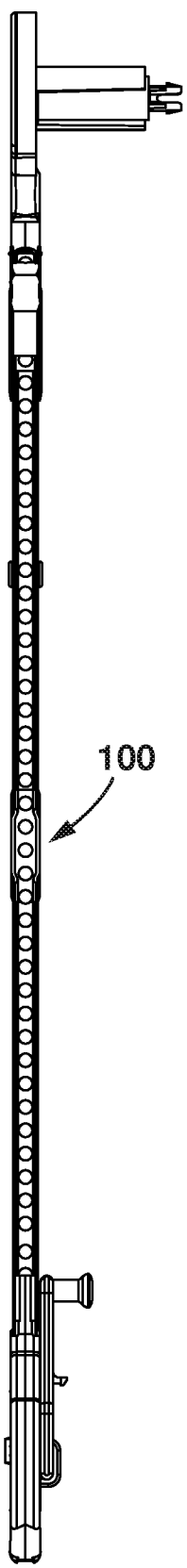
FIGS. 8a, 8b, 8c, 8d, 8e, 8f illustrate another embodiment.
Figure 8B:
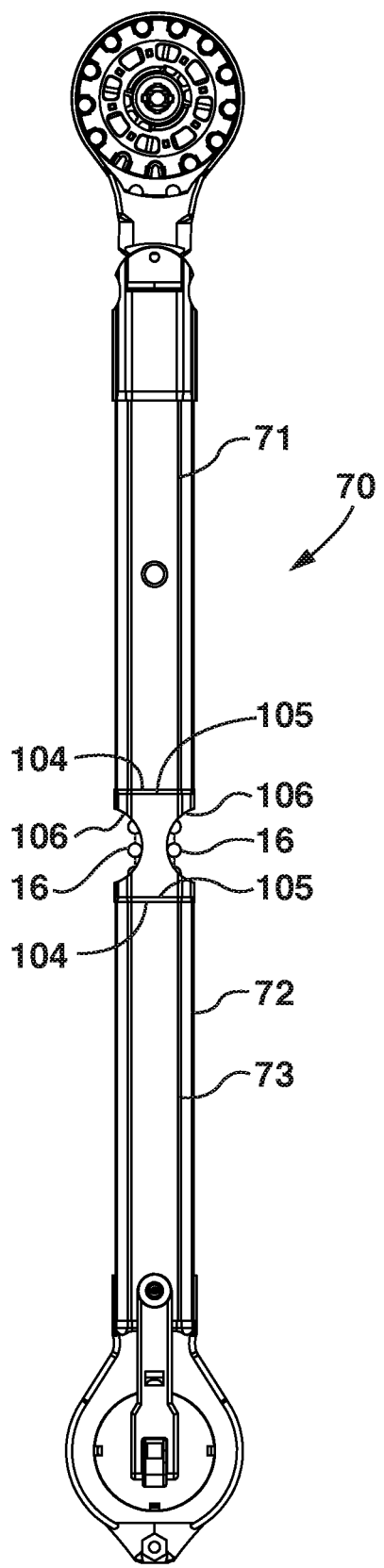
Figure 8C:
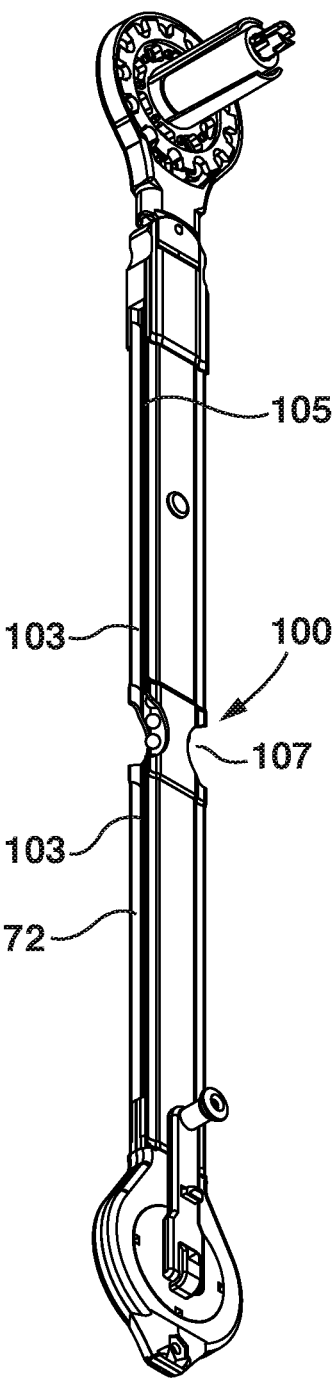
Figure 8D:
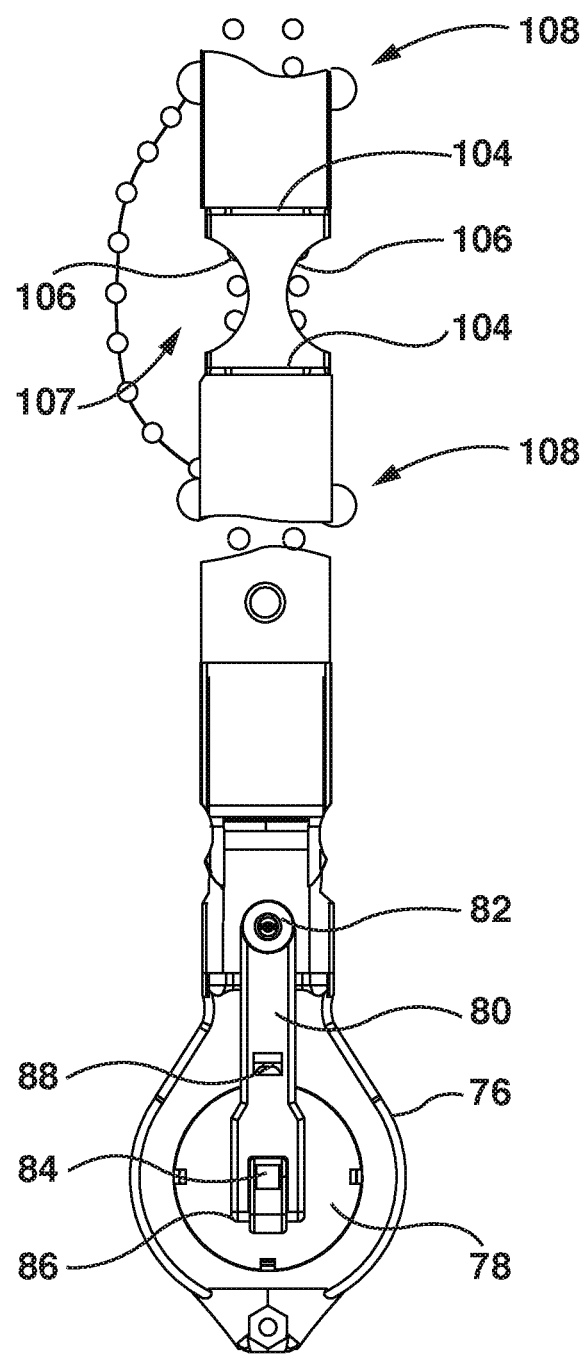
Figure 8E:
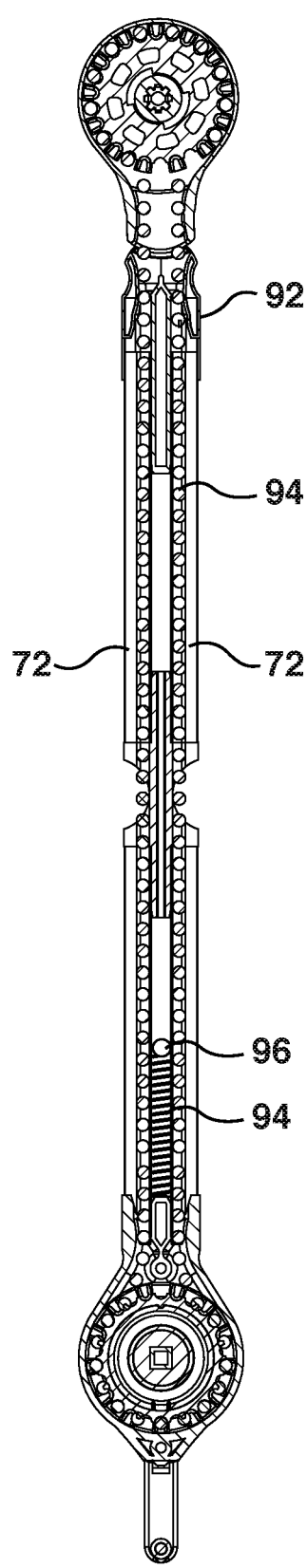
Figure 8F:
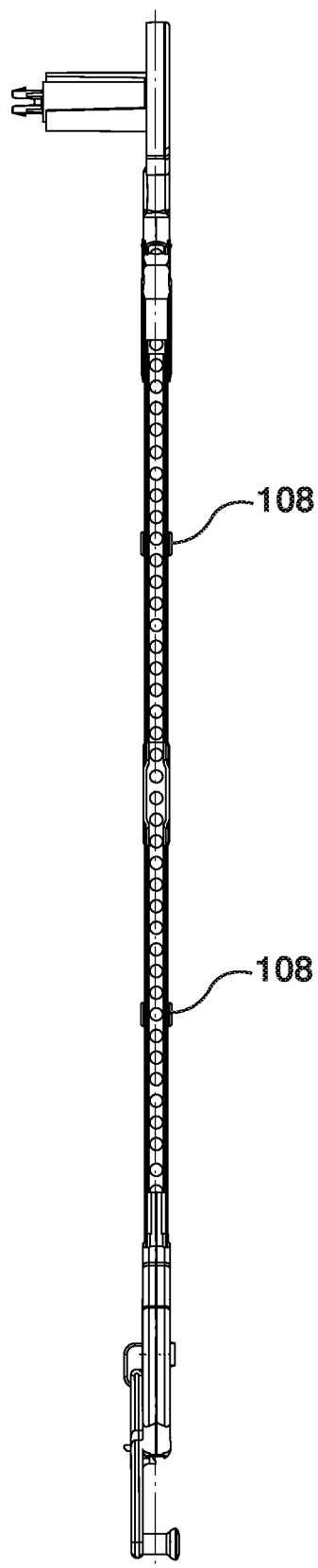

Stop members 108 can be secured in the channels 72 (FIGS. 8a, 8d and 24). These will have the effect of limiting the length of the chain or element 16 that can be pulled out from one or other channel 72. This will still further enhance the overall safety of the product.

The stop members 108 may be slideably adjustable along each channel, by sliding along the length of the channel 72 to a selected position and can be secured by clamping screws 111 or any number of other fasteners including adhesives or snapping the parts together, Between the upper and lower shoulders 104 there are recesses 106 of generally semi-arcuate concave shape. These recesses expose the element 16 along a short length on either side edge 107 of the connector body 100. The recesses 106 provide access for adults to action the element 16 to operate the blind in the traditional way. The finger access 106 is high enough from the floor out of reach from children. In other words another embodiment consists of eliminating the drive 40 and just using the finger access 106; or having a choice of selectively using the finger access or driver 40.

This is to enable a person to grasp the element 16 with finger and thumb, within such recesses 106 and to manually adjust the element 16 one way or the other, for moving the blind.

In another embodiment the finger access 106 could be formed in the side of a one piece wand 70.

While doing this the safety device or element 16 will have to be pulled slightly away from the side edge 107 or edges of the wand 70, FIG. 8d. This will result in the wand 70 becoming in effect slightly shorter with the wand sliding into a sleeve 92, compressing spring 94.

When released the wand will slide partially out of the sleeve 92. The element 16 will then be drawn back into the channels of the wand 70.

In this way, it is possible for the homeowner to make simple manual adjustments, by grasping and moving the element with the fingers, without leaving a hanging loop of the element 16 free to create possible hazards.

Stop members 108 can be secured in the channels 72 (FIG. 8a, 9d). These will have the effect of limiting the length of the chain or element 16 that can be pulled out from one or other channel. This will still further enhance the overall safety of the product. Although four stop members 108 are shown, any number can be used within the scope of this invention.

The stop members may be adjustable along each channel, by sliding along the length of the channel 72 to a selected position and can be secured by clamping screws.

The interior of a wand 70 defines an internal rectangular tube 74 (FIG. 12). At the lower end of the wand 70 a housing 76 (FIG. 8d) encloses the drive member 78 for driving the element 16.

This drive member 78, in this case, has a winding arm 80 and knob 82. The arm 80 is attached to an axle 84 driving the drive member 78.

The arm can be swung, by joint 86 to lie flat against the housing. A lock member 88 holds the arm in this position when not in use.

The axle 84 preferably has a keyed opening a female socket 56, in this case being simply square.

A suitable hand held appliance 67, i.e. an electric motor appliance, powered by a battery (FIG. 13) with a suitable keyed drive tool 72 which can be inserted in the keyed opening 84 and power operated, to raise or lower the blind.

Within the rectangular tube 74 of the wand 70 there is a spring 94 with one end resting on a support surface or button 96 (FIG. 10) The other end of the spring 94 engages an end of a rod 98 inside the tube 74. The rod 98 in this case is moulded as part of the sleeve 92. The effect of the spring 94 is to urge the wand 70 out of the sleeve 92 so as to keep the element 16 taught. The sleeve 92 and spring 94 spring are in one embodiment located between the lower end on the wand 70 and the drive device housing 76. However in other embodiments the spring could be located in the middle or tor top end of the wand in accordance with the invention described.

The side view of the embodiment shown in FIG. 8a shows the safety shape of the H channel that conceals the chain or chord 16 on a safe way not generally accessible to children. It should be noted that other cross sectional shapes can be used in other embodiments of the invention.

In some cases it may be preferable to locate the sleeve and spring between two sections 71 and 73 of the wand.

In another embodiment shown in FIGS. 9a, 9b, and 9c, the wand 70 is in two parts, upper part 71 and lower part 73. Between the two parts there is a connector body 120 (and FIG. 14).

Connector body 120 has upper and lower struts 124 extending from the connector body 120 into the tubes 74 of the upper 71 and lower 73 portions of the wand 70. In this way the struts 124 act as a form of splint holding all three components together. The connector body 120 is formed at each end with shoulders 104 mating with the lateral sides 103, 105 of the channels 72 on opposite side edges of the wand 70.

Stop members 108 can be secured in the channels 72 (FIGS. 8a, 9a, and 24). These will have the effect of limiting the length of the chain or element 16 that can be pulled out from one or other channel 72. This will still further enhance the overall safety of the product.

The stop members 108 may be slideably adjustable along each channel 72, by sliding along the length of the channel 72 to a selected position and can be secured by clamping screws 111.

If a motor drive appliance is required, it could be made as shown in FIG. 13. This would have the proportions of a simple flashlight. There would be a housing containing one or more batteries (not shown). A switch 65 would enable it to be switched on and off. A motor in the housing (not shown) would be driven by the batteries.

A drive tool 72 would extend from one end of the motor drive 67. The tool 72 would have a keyed shape, corresponding the key way shape of the recess 56 in the axle 84.

When required the homeowner would simply insert the tool 72 into the key way in the axle 84 and operate the motor.

In yet another embodiment one could eliminate the connector body 120 and use a one piece wand 70 and form a hole transversely through the wall of the wand 70 so as to attach a cam 123. In yet another embodiment one can eliminate the driver 40 and just use the handle 128 and cam 123, or having a choice of selectively using the handle 128 and cam 123 or driver 40.

In another embodiment the safety device or he wand 70 can be made in two or more lengths, one being slightly larger than the other, to enable the two lengths to be telescoped together FIG. 11 or 16. As explained this feature may be useful where a homeowner wishes to retrofit the system onto an existing blind with old technology dangling loop elements.

Figure 15:
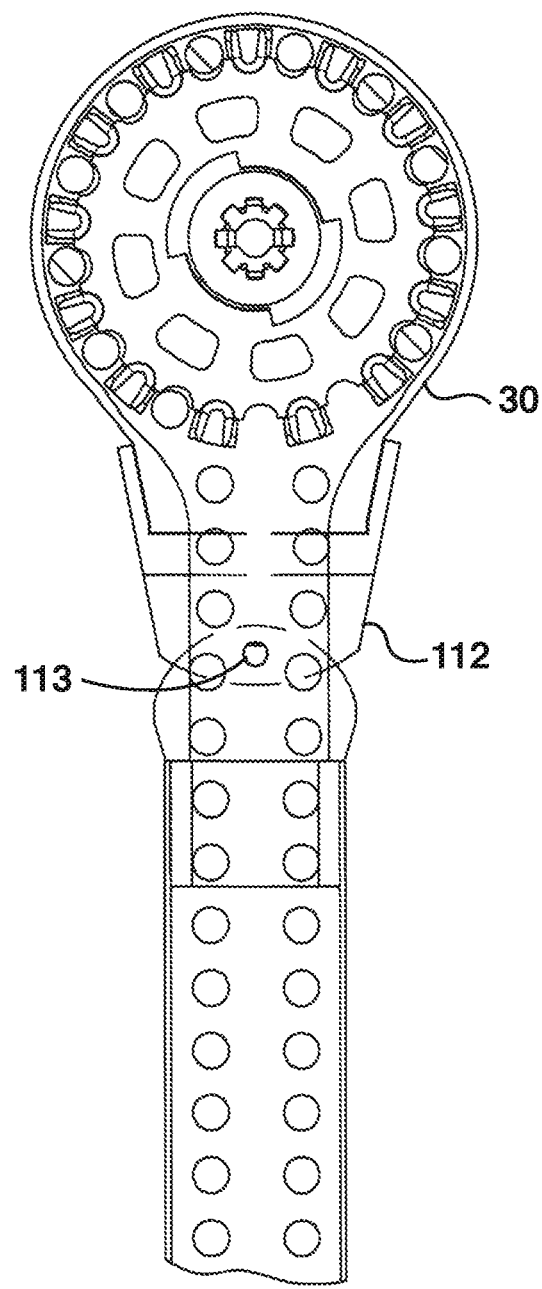
FIG. 15 is a schematic view in plan of an alternate embodiment.

In order to promote such retrofitting, and improve home safety, the invention also provides an adapter collar 112 (FIG. 15).

This collar is intended to be attached directly onto the sprocket housing 30 of an existing old technology blind. The collar 112 may be secured to the sprocket housing 30 by for example a screw 113 or adhesive or other fastening means. The interior of the collar 112 has guide surfaces, guiding the element 16 from the sprocket down into the safety device or enclosure which may either be the wand 70, or tube 20.

The homeowner can then simply take the safety device or enclosure 20, 70 and slide the element loop 16 down through the enclosure 20. The drive device at the lower end of the element is provided with a housing in two parts, or a housing door which can be opened, to fit the element loop around the sprocket or other drive member. The housing would then be closed.

A further embodiment is shown in FIG. 17. In this case there is an element guide body 114, separate from the wand 70. The element guide body 114 would be attached to the window frame, or wall, by for example a screw 116 with a wall plug 117, and spacers 119, if required, so as to maintain the body aligned in the path of the element 16.

Element guide body 114 has guide surfaces providing a smooth path for the element from the blind sprocket into the wand 70.

Figure 14:
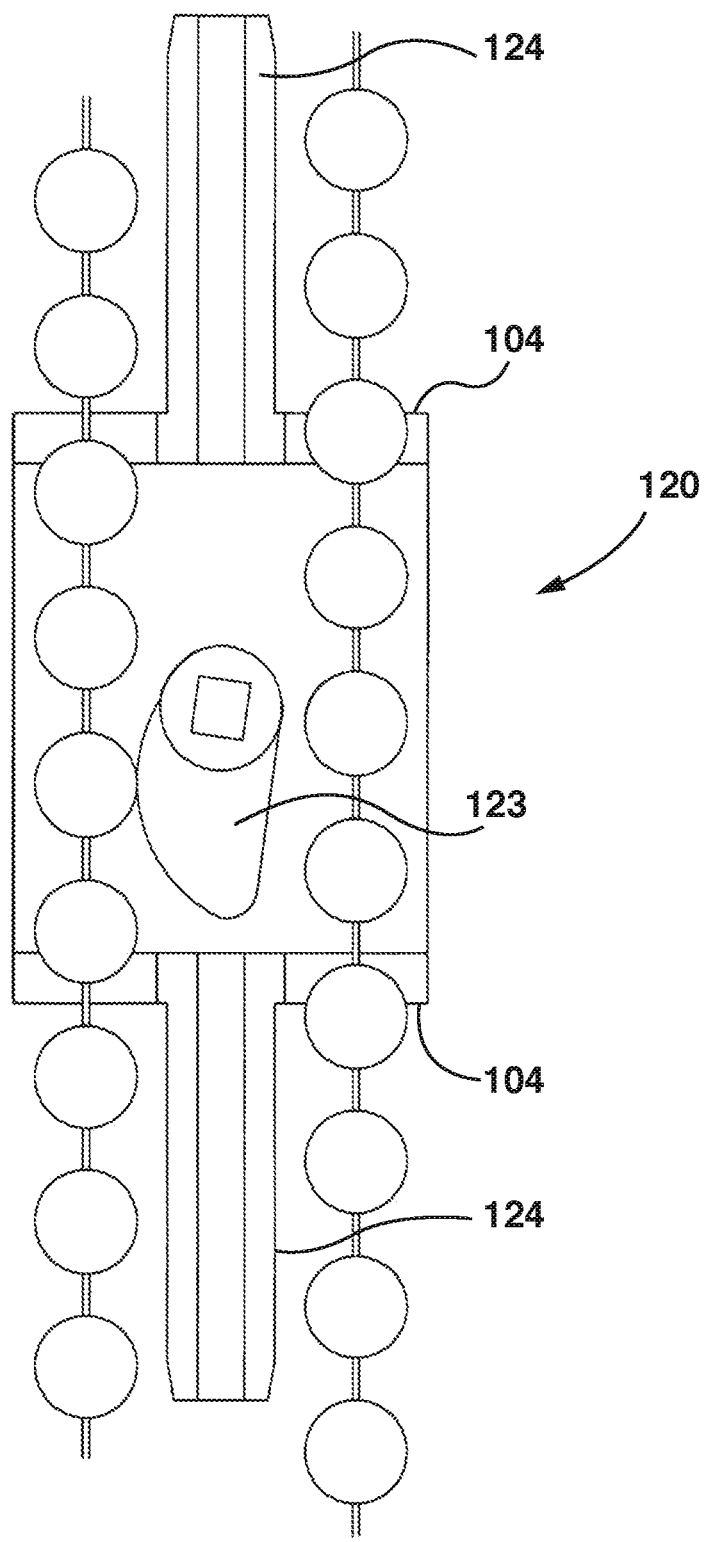
FIG. 14 is a section of an alternate embodiment of connector body showing a cam member.

In another embodiment best shown in FIGS. 9a, and 14 there is a sliding coupling and spring 120 connector between upper and lower wand sections 71 and 73. Between the two sections 71 and 73 there is a connector member 120, having two rods 124 (FIG. 9a, 17) which extend into the central tubes of the two enclosure sections. Connector member 120 is of generally H-shaped cross section defining channels 72, on opposite sides, for receiving the element 16.

Member 120 is hollow and contains a cam 123, similar to FIG. 14. The cam 123 may be manually swung to one side or the other, by an exterior lever 128. Swinging of the handle 120 will project the cam 123 and element 16 on one side or the other of the member 120. This will enable the user to grasp the element and move it, thus adjusting the blind with the fingers.

In doing so the enclosure will be forced against the spring 94. When the element is released, the spring will extend the enclosure away from the member 122 and tension the element back into the channel 72 away from the reach of children.

Figure 18:
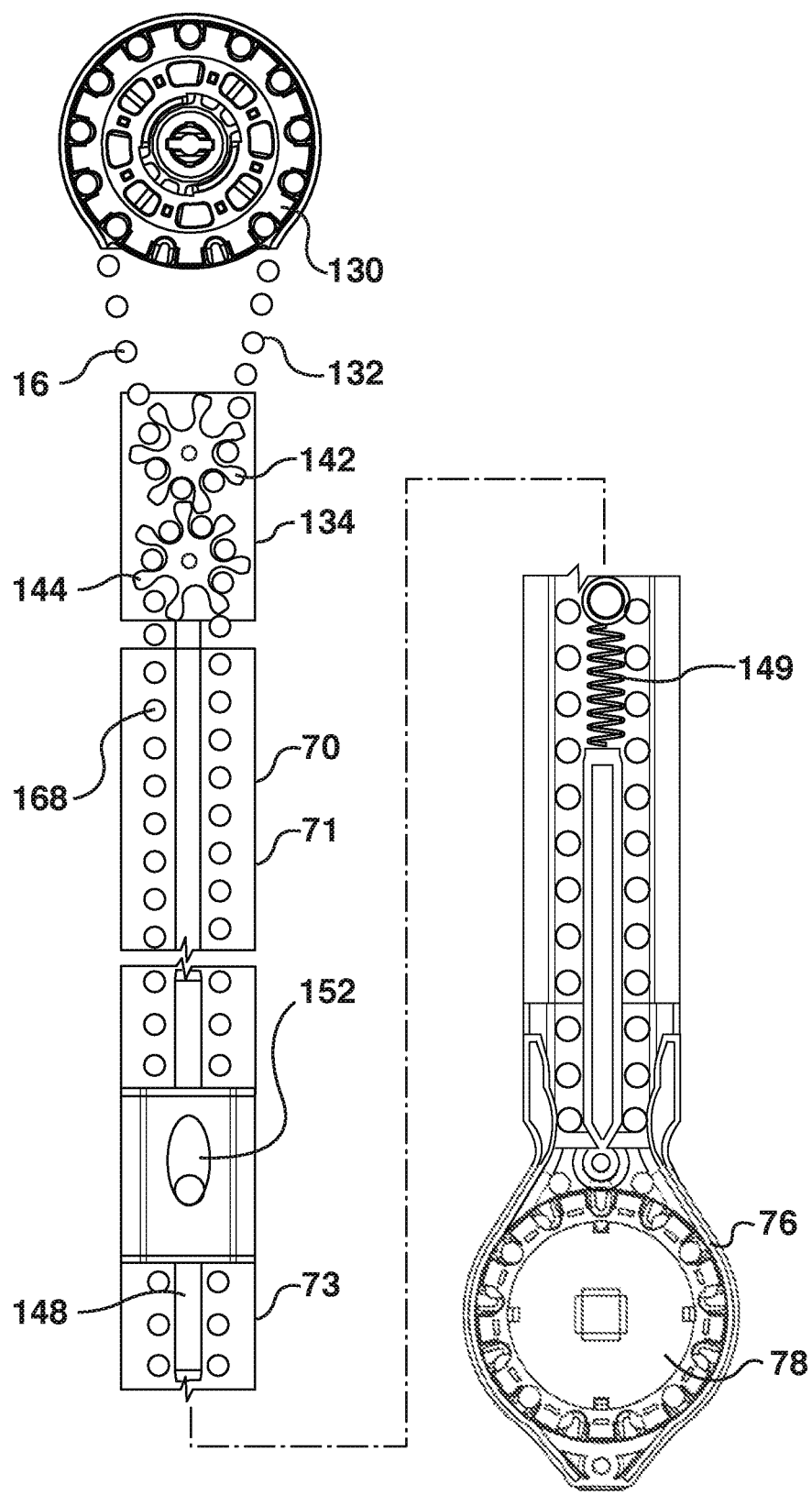
FIG. 18 is an exploded plan view of another embodiment with a spring disposed near the bottom end.
Figure 19:
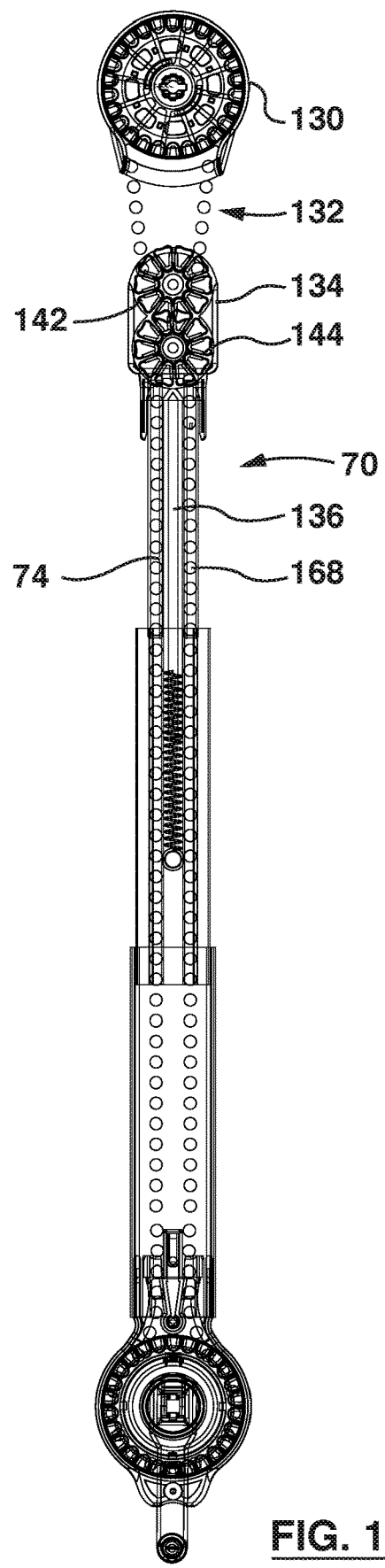
FIG. 19 is a cut away perspective of another embodiment with a spring disposed near the middle.

Other embodiments are shown in FIGS. 18 and 19. In this case the blind sprocket 130 is driven by a short loop 132 of the element 16. Short loop 132 extends down and passes into a gear body 134. Gear body 134 had an integral rod 136 extending down into the tube 74 of the wand 70.

Within gear body 134 the short loop 132 passes around a first drive gear 142 rotatably mounted in body 134.

Gear body 134 hangs down on a short loop 132. It is not secured to any wall or window frame. A second drive gear 144 is also rotatably mounted in gear body 134, and meshes with first drive gear 142.

The wand 70 is separate from gear body 134 and contains a long loop 168 of the element 16. Long loop 168 extends up out of the top end of the wand 70 and passes into gear body 134 around second drive gear 144. At the lower end of wand 70 the long loop passes around a drive system already described above.

Movement of the long loop 168 caused by the drive 40, 76 (or simply by the fingers engaging holes 60 as previously discussed) will rotate second gear 144. This in turn will rotate first gear 142, thus moving the short loop 132.

In the embodiment shown in FIG. 9a the wand 70 is formed in two sections 71 and 73, joined by a connector body member 120, having rods 124 extending into the two sections of the wand 70. The connector body 120 has side channels (described above) for the element 16.

A cam mounted within connector body 122 can be swung right or left, by a lever 152 Swinging of the cam will push a portion of the long loop 168 out of the body 146 on one side or the other. The operator can then grasp the element in the fingers and move it by hand, if he wishes, to adjust the blind. In doing so he will, in effect, shorten the long loop 16. This will force the wand 70 to move compressing the spring 149.

Once one releases the element 16, the spring 94 will extend the safety device or enclosure 20 and the element 16 will be retracted back into the channel 72 in the connector body 120.

It will be seen that with this embodiment the gear body 134 is not secured to the window frame 12, or to the wall of the building. This will reduce the chance that the wand 70 and the element 16 may be rendered unserviceable, due perhaps to the loosening of the fastening.

Further embodiments of the enclosure is shown in FIGS. 20a, 20b, 20c, 20d, 20e, 20f, 20g and 20h.

Figure 20A:
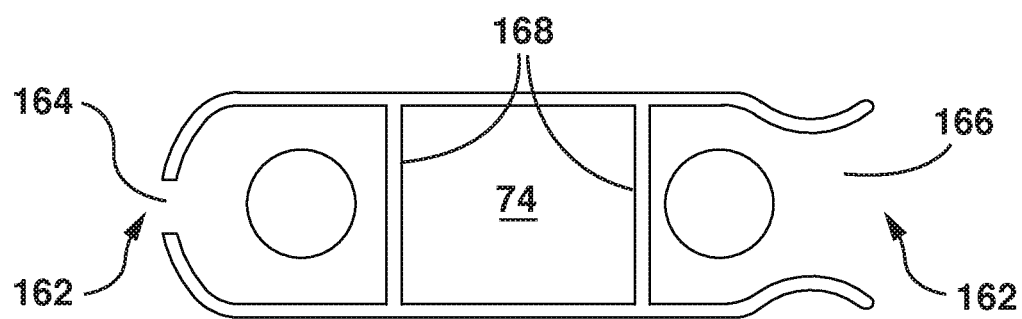
FIGS. 20a, 20b, 20c, 20d, 20e, 20f, 20g and 20h are sections of a further embodiments showing a wand enclosure FIG. 21 shoes a further embodiment of the enclosure pivoting about an axis.

In FIG. 20a the enclosure 160 has one side edge 162 of the enclosure almost closed, except for a small slot 164 where the wire portion of the element 16 can be inserted.

The other side edge of the enclosure is a restricted channel 166, with shallow concave restrictions.

Within the enclosure there are two transverse walls 168, separating the two lengths of the element from each other.

Figure 20B:
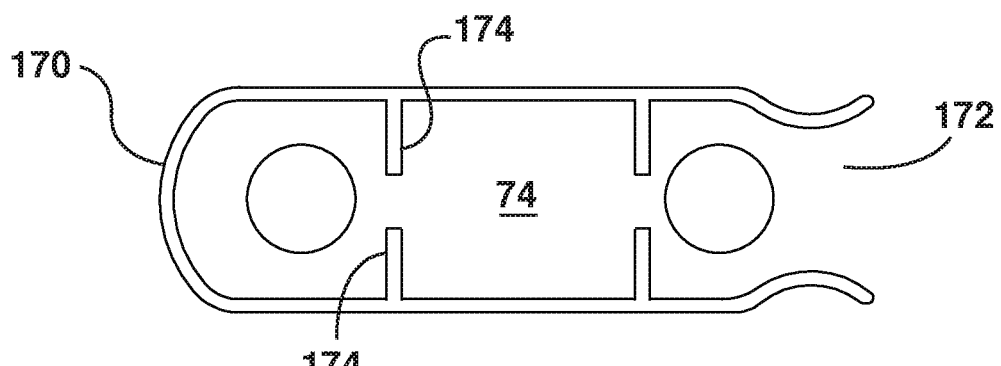

In FIG. 20b the enclosure has one side edge 163 completely closed at 170 and the other side edge a restricted channel 172. In this case there are two pairs of partial interior walls 174 and 176. The two pairs define between them small gaps. These gaps enable the passage of the wire portions of the elements to be passed down for threading the element loop into the enclosure.

Figure 20C:
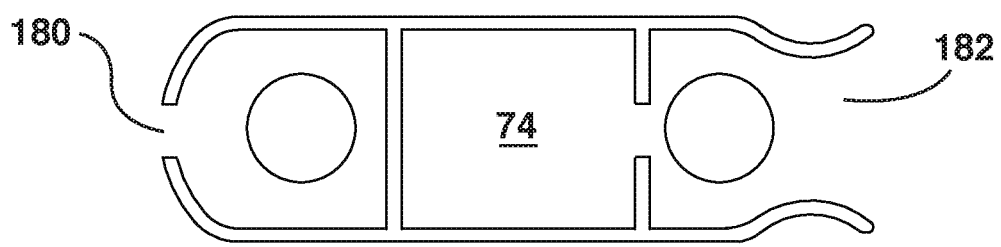

In FIG. 20c the one side edge has an almost closed tube 178 with a small slot 180. The other side edge has a restricted channel 182 with restricted side walls.

Figure 20D:
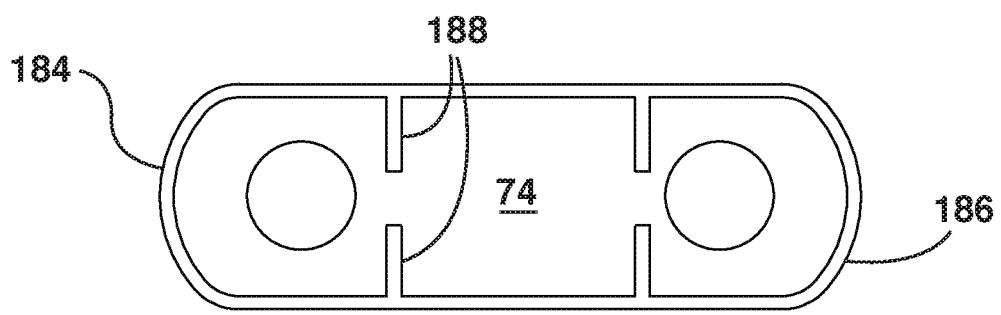

In FIG. 20d the enclosure has two closed tubes 184 and 186. Two pairs of interior partial transverse wall 188 and 190 each define small gaps between them. These gaps permit the passage of the wires, between the balls on a chain element to be slid between them. This enables a loop of an element 16 to be introduced through the enclosure from one end to the other.

Figure 20E:
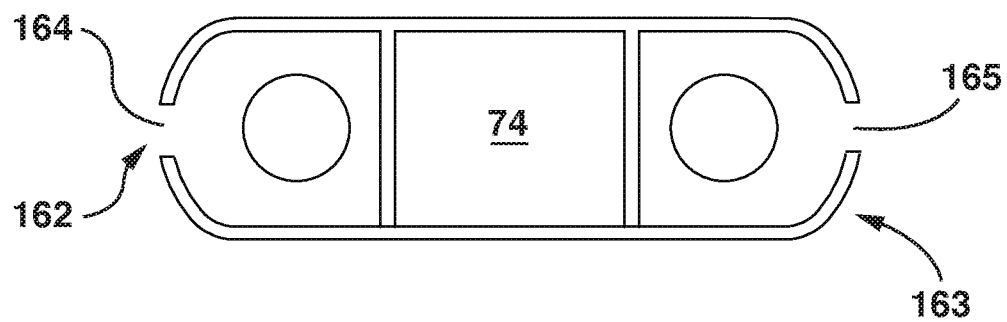

FIG. 20e illustrates another embodiment of the invention where the enclosure has one side edge 162 having a slot 164 where the wire portion of the element 16 can be inserted. The other side edge 163 has a slot 165 to receive the wire portion of the element 16. Both slots 164 and 165 are small enough so that the "balls" of the element 16 do not pass through the slots 164 and 165.

Figure 20F:
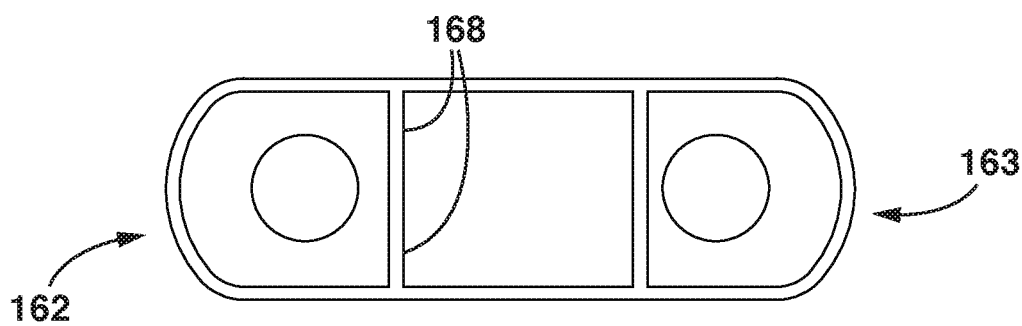

FIG. 20f illustrates another embodiment where the enclosure has two closed side edges 162 and 163 and two internal partition walls 168. In this embodiment a single "string of element 16 having a plurality of balls spaced along the wire portion (ie cut loop) can be used to loop the "string" about the blind operating mechanism, with the two ends of the placed through the spaces between the closed side edges 162 and 163 and the partition walls 168 respectively; with the ends of the strings connected together by welding for example (by sonic welding or other means) so that the formed connected loop can be placed about the rotatable drive device on the lower end of the enclosure. The device has springs 94 which will permit the connected ends forming the loop to engage the blind operating mechanism and rotatable drive device since the spring can be compress to bring the upper and lower ends to of the enclosure together to permit engagement of the endless loop with the blind operating mechanism and rotatable drive device.

Figure 20G:
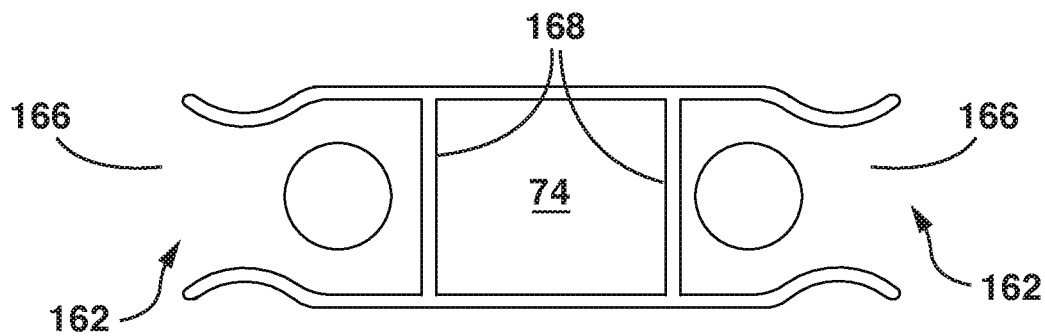

FIG. 20g is similar to FIG. 20a except both sides 162 include the restricted channel 16.

Figure 20H:
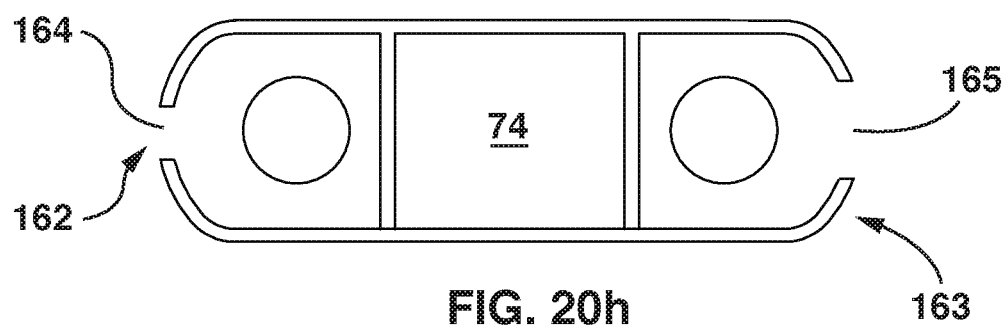

FIG. 20h illustrates another embodiment of the invention where the enclosure has one side edge 162 having a small slot 164 where the wire portion of the element 16 can be inserted. The other side edge 163 has a slot 165 which is slightly larger than slot 164 to receive the wire portion of the element 16. Both slots 164 and 165 are small enough so that the "balls" of the element 16 do not pass through the slots 164 and 165.

Figure 21:
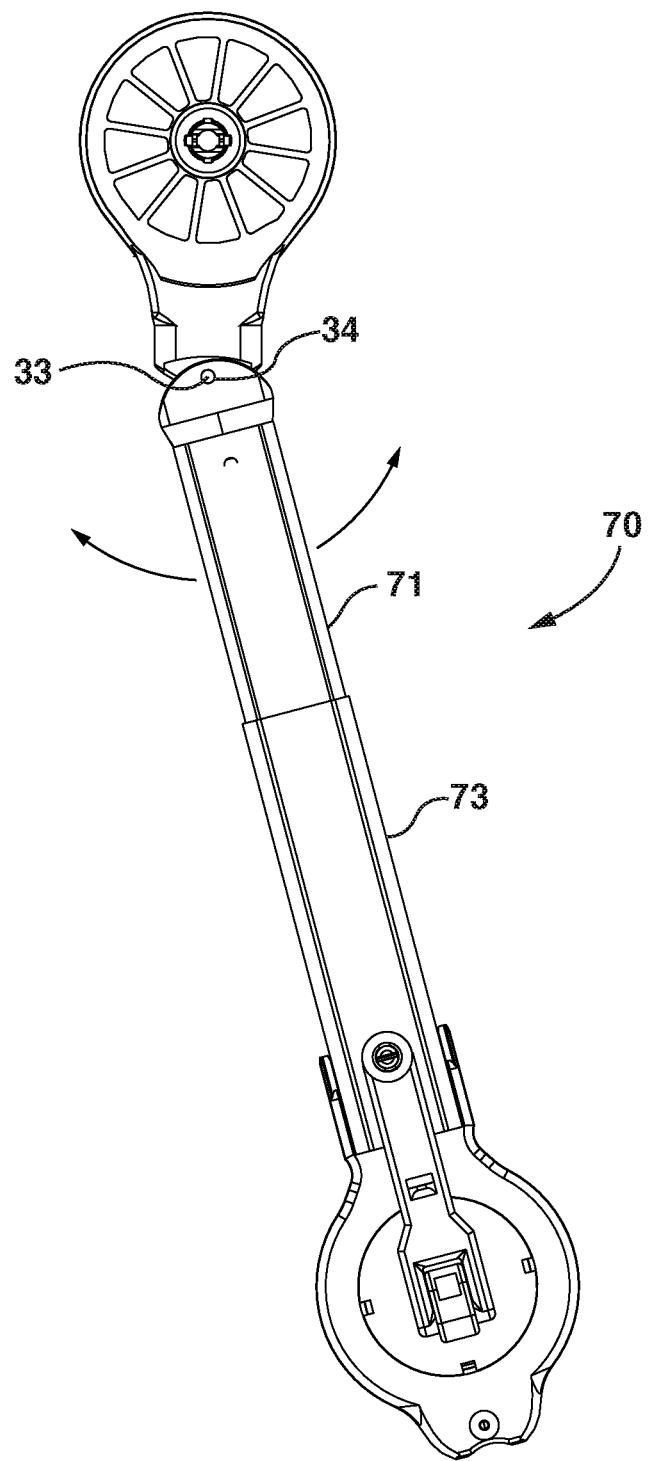

FIG. 21 shows another embodiment of the invention where the wand 71 & 73 pivots about axis 33 (screw 34).

Figure 22:
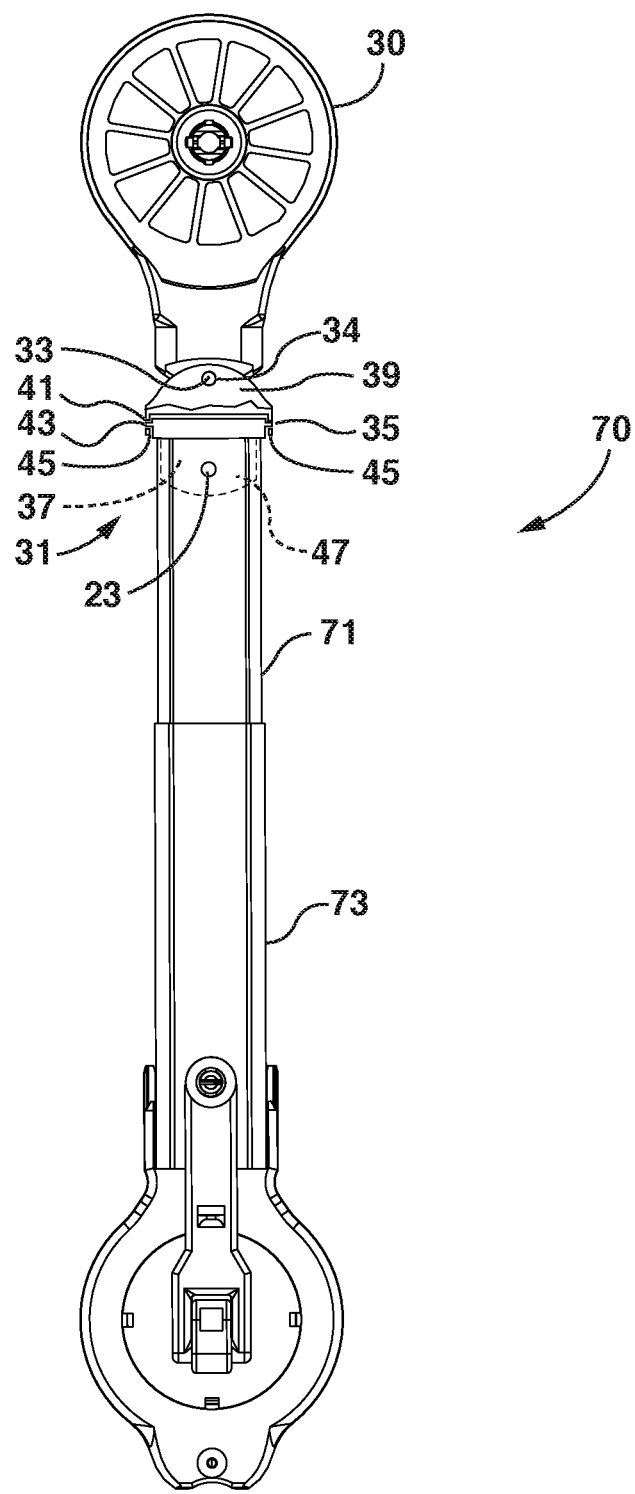
FIG. 22 shows a further embodiment of the enclosure pivoting about a first and second axis.

FIG. 22 is similar to FIG. 21 except the wand 70 in FIG. 22 pivots or rotates about axis 33 defined by a screw 34 BUT also pivots about the two projections 35 that define a second axis 35-35 (i.e. the bottom part pivots out of the page).

Swinging connector 31 comprises first swinging connector 39 which is secured to the sprocket housing 30 by means of a fastener 43. The first swinging connector 39 has two arms 45 having aligned holes 41 defining the axis 35-35. The second swing connector 37 has a depending portion 47 that is attached to the upper part of the enclosure 20 by a fastener 23. The second swing connector 37 includes two projections 35 that are journaled for rotation within holes 41. The swing connector 31 allows the device to pivot about an axis defined by screw 43 so as to pivot about a first axis and also to pivot about a second axis defined by 35-35.

FIG. 23 is a partial exploded view of another embodiment showing slideable stoppers. Furthermore FIG. 23 shows that the upper end of the enclosure 20 is without a sprocket where the weight of the enclosure provides the tension in the element 16 between the housing 30 and blind operating mechanism and upper end of the enclosure 20. FIG. 34 is similar to FIG. 23 except that FIG. 34 has a sprocket in the vicinity of the upper end of the enclosure 20 and provides the "tension" in the element between the upper end of the enclosure 20 and lower end of the enclosure. Extensions 129 engage with the upper end of enclosure 20.

Figure 26:
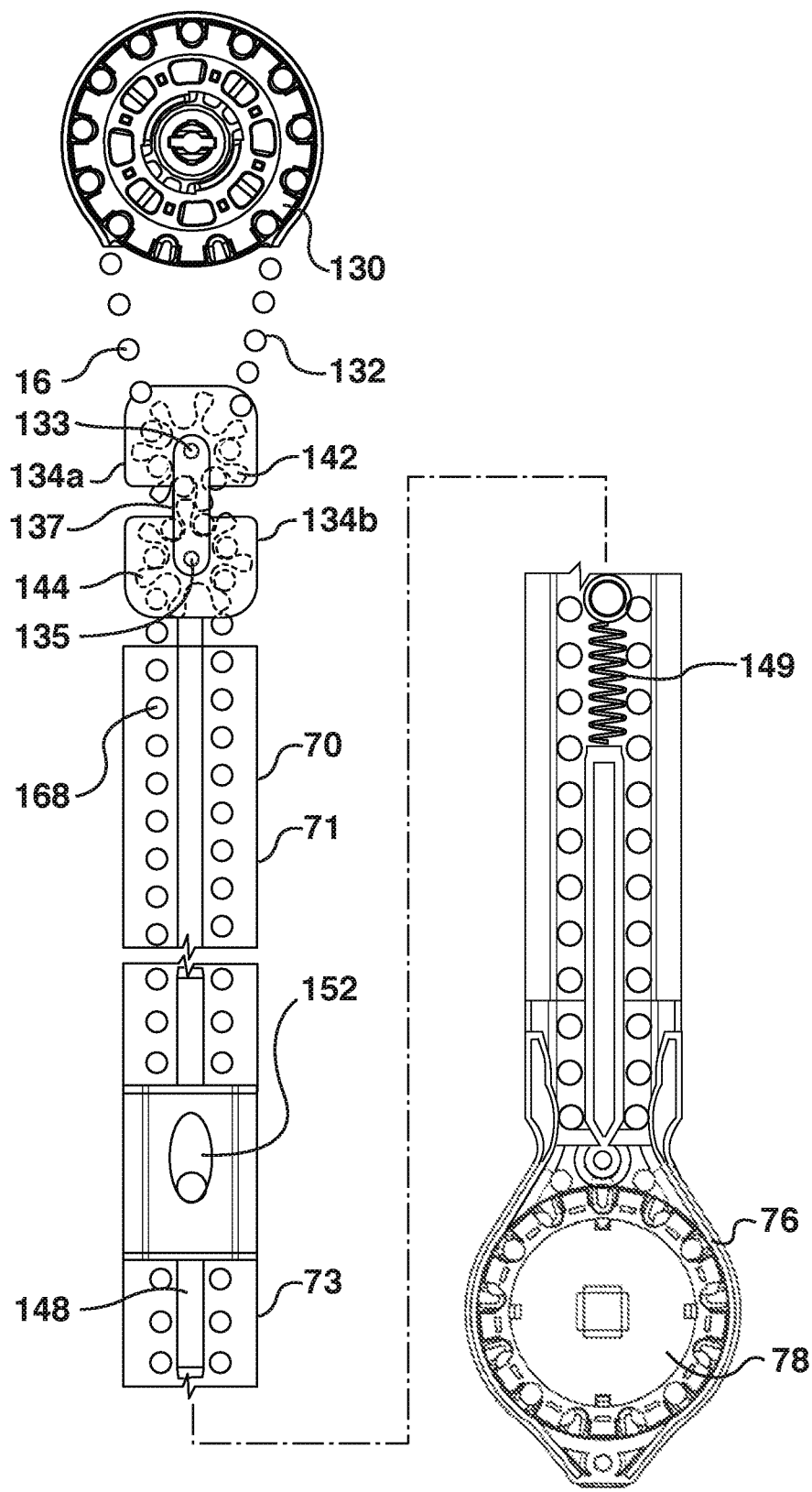
FIG. 26 is a view showing two spaced gear boxes joined together by a link.

In other words the invention described herein can have an upper end of the enclosure 20 or wand 70 with no sprocket (see FIG. 23), one sprocket (see FIG. 34) or a pair of sprockets (see FIGS. 18, 19 and 26).

FIG. 24 shows one embodiment of the stoppers 108. The stopper 108 has an upper section that fits over the recess 72 and a lower section 200 that fits in the recess 72 that is fastened together by a screw 111. The lower section 200 is concave in cross section 201 and convex 204 along the length so as to provide a smooth surface to the element 16 to slide against.

FIG. 25 illustrates the use of a sprocket 142 that is a single piece having an integrated pair of sprockets with a first set of "troughs" 142a that engage the "balls" of element 132 and a second set of "troughs" 142b that engage the "balls" of element 168. When the loop defined by element 168 rotates clockwise the sprocket rotates clockwise and the troughs 142a and 142b rotate clockwise and the loop defined by elements 132 also rotates clockwise.

FIG. 26 shows a further embodiment of invention where the gear box 134 (shown in FIG. 18) comprises two spaced gear boxes 134a and 134b and the two spaced gear boxes 134a and 134b are connected at protruding shafts 133 and 135 by a linking means such as a link 137.

FIG. 33 is similar to FIG. 25 except that the wand 71 may have an extended length (when for example the window is large or located near the ceiling). In this example another section of wand 71b can be added by using a second set of spaced gear boxes 134a and 134b. Another link 137 can connect the sprockets by engaging protruding shafts 133 and 135. Any number of spaced gear boxes 134a and 134b can be used depending on the length of wand 70.

Figure 27:
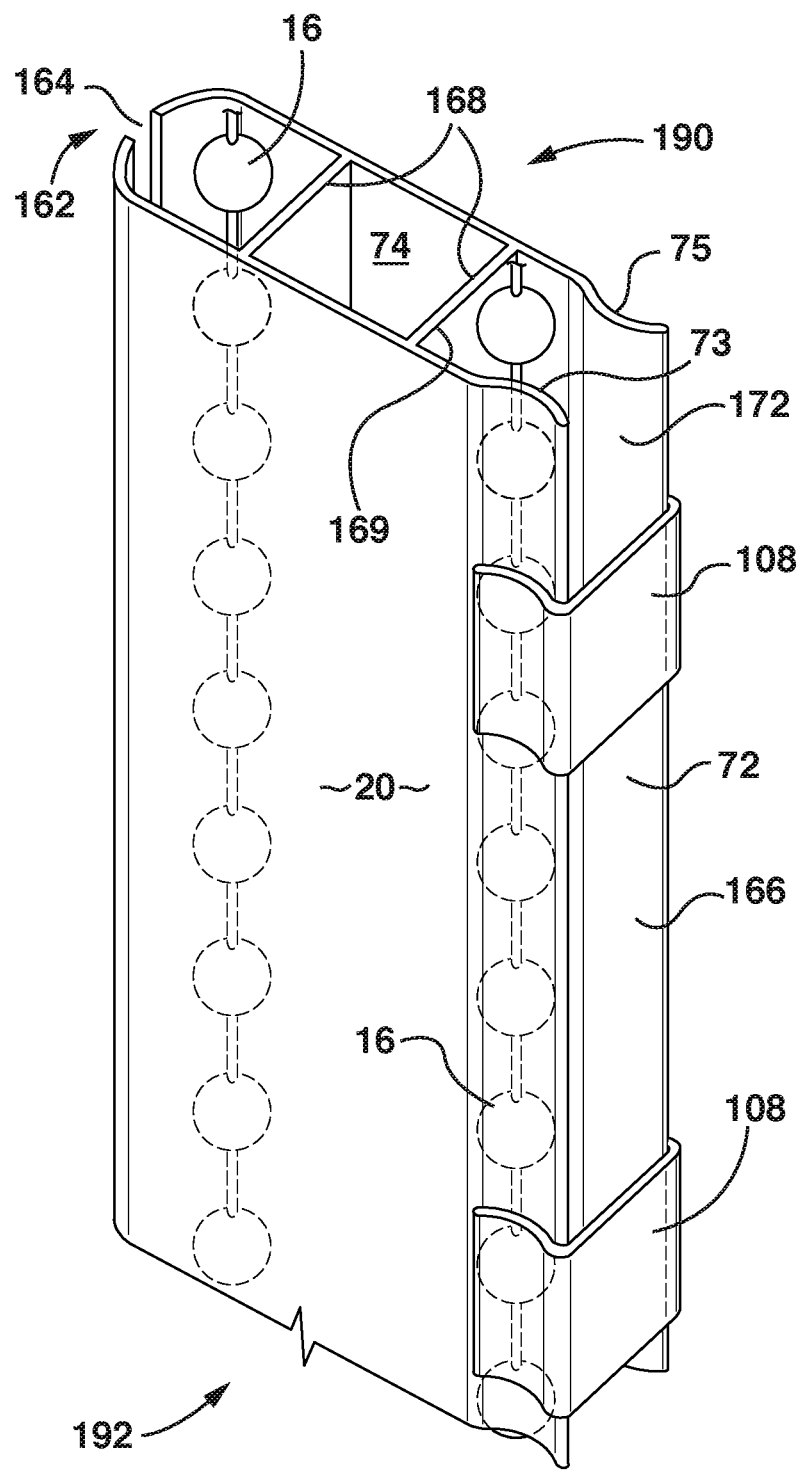
FIG. 27 is a partial perspective view of another embodiment showing stoppers and a first portion of element outside the enclosure and a second portion of the element inside the enclosure.

FIG. 27 shows a further embodiment of the invention whereby the enclosure 20 has a cross section similar to those shown in FIGS. 20a, 20b, 20c, 20d. However the enclosure can have other cross section in accordance with the teachings of this invention.

FIG. 27 illustrates a safety device 20 for an endless loop blind control element 16 whereby the enclosure 20 has at least one pair of spaced sliding members 108 where the spacing between the sliding members 108 can be selectively adjusted for inhibiting access to a portion of the endless blind control element 16 between adjacent two spaced sliding or stopper members 108. In particular, the spaced sliding members 108 attach to an open side 172 of the enclosure 20 and resiliently embrace adhere or fasten to the shallow concave curvature 73 and 75 as previously described. Fasteners 111 can also be used as previously described in FIG. 24.

The endless loop blind control element 16 includes a plurality of spheres connected together by a cord in a manner well known to those persons skilled in the art. The cross section as shown in FIG. 27 includes a slot 164 which is slightly larger than the thickness of the cords of the element 16 so as to permit the cord to slide through the slot 164 thereby permitting the spheres to be enclosed in one end 162 of the enclosure 20 as shown. The other end of the enclosure 20 includes a recess 72 as previously described for retaining a second portion of the endless loop blind control element 16. By slidingly adjusting the spacing between the sliding members 108, one can permit an adult to reach in with a finger and thumb and pull out a second portion of the endless loop blind control element 16 between the sliding members 108 so as to adjust the blind as previously discussed. The lateral ends 190 and 192 can include any of the structures previously described.

Transverse walls 168 are shown in FIG. 27 to strengthen the enclosure due to the slit 164. However the transverse walls can embrace any of the configurations shown in FIGS. 20a, 20b, 20c, and 20d depending on the thickness of the enclosure and the material used such as aluminum, plastic or the like.

Figure 28:
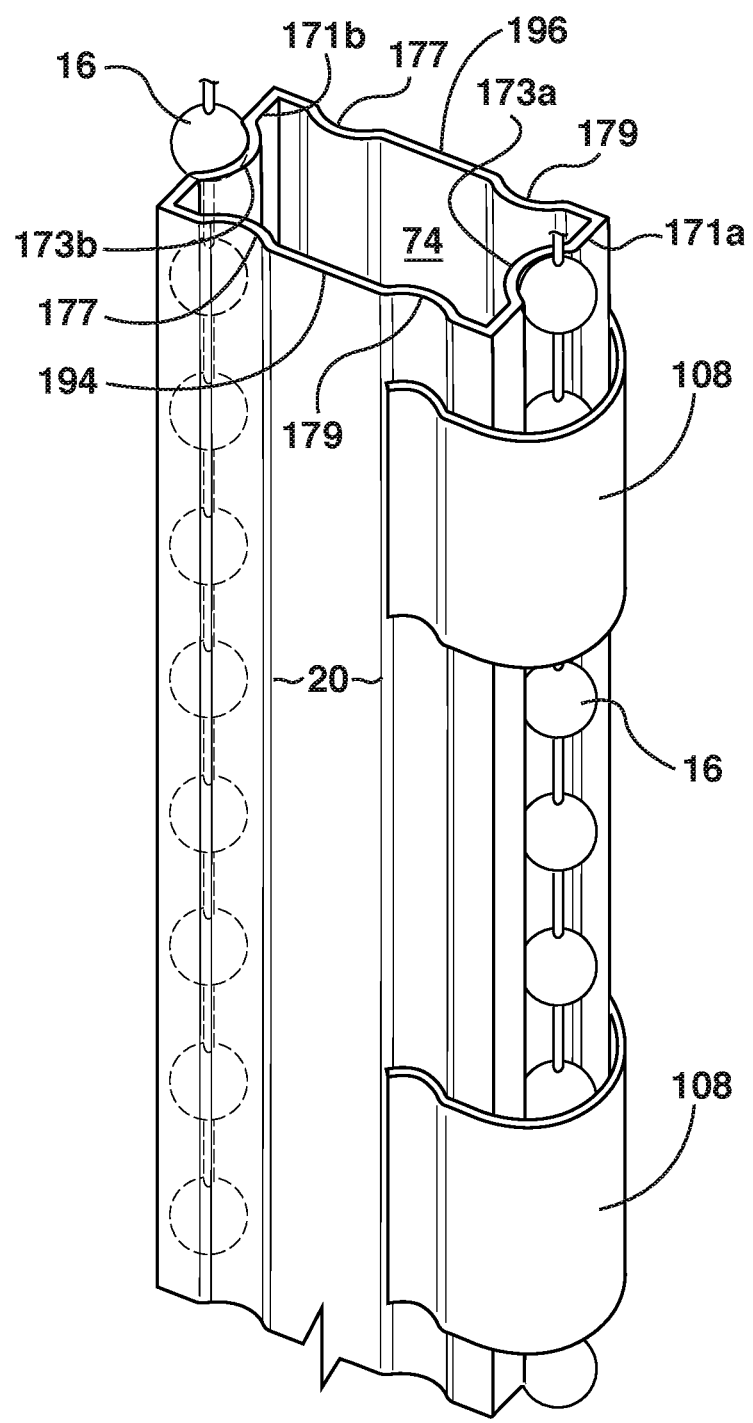
FIG. 28 is a is a partial perspective view of another embodiment showing stoppers and an enclosure having a rectangular cross section with a first portion of element outside the enclosure and a second portion of the element outside the enclosure.

FIG. 28 shows yet another embodiment of the invention which is similar to FIG. 27, except that the enclosure 20 has a generally rectangular cross section as shown. The enclosure 20 has spaced opposite sides 194 and 196 with spaced opposite ends 171a and 171b and includes seating or retaining means such as grooves 173a and 173b disposed on opposite ends 171a and 171b of the cross section which are adapted to receive a portion of the endless loop blind control element 16 as shown. The grooves 173a and 173b stabilize the endless loop blind control element 16 therein.

FIG. 28 also shows a pair of spaced apart sliding or cover members 108 which have ends that embrace grooves 179 on opposite sides 194 and 196 of the enclosure 20. Furthermore, grooves 177 are also included on sides 194 and 196 of the enclosure to retain sliding members 108 disposed on the opposite end 171 b (not shown).

As previously described, the sliding members 108 can be selectively adjusted as to the spacing there between so as to permit an adult to grasp the endless loop blind control element 16 and adjust the blind as previously described.

The sliding member 108 shown are an example only, as other sliding member can be used in accordance with this invention.

Figure 29:
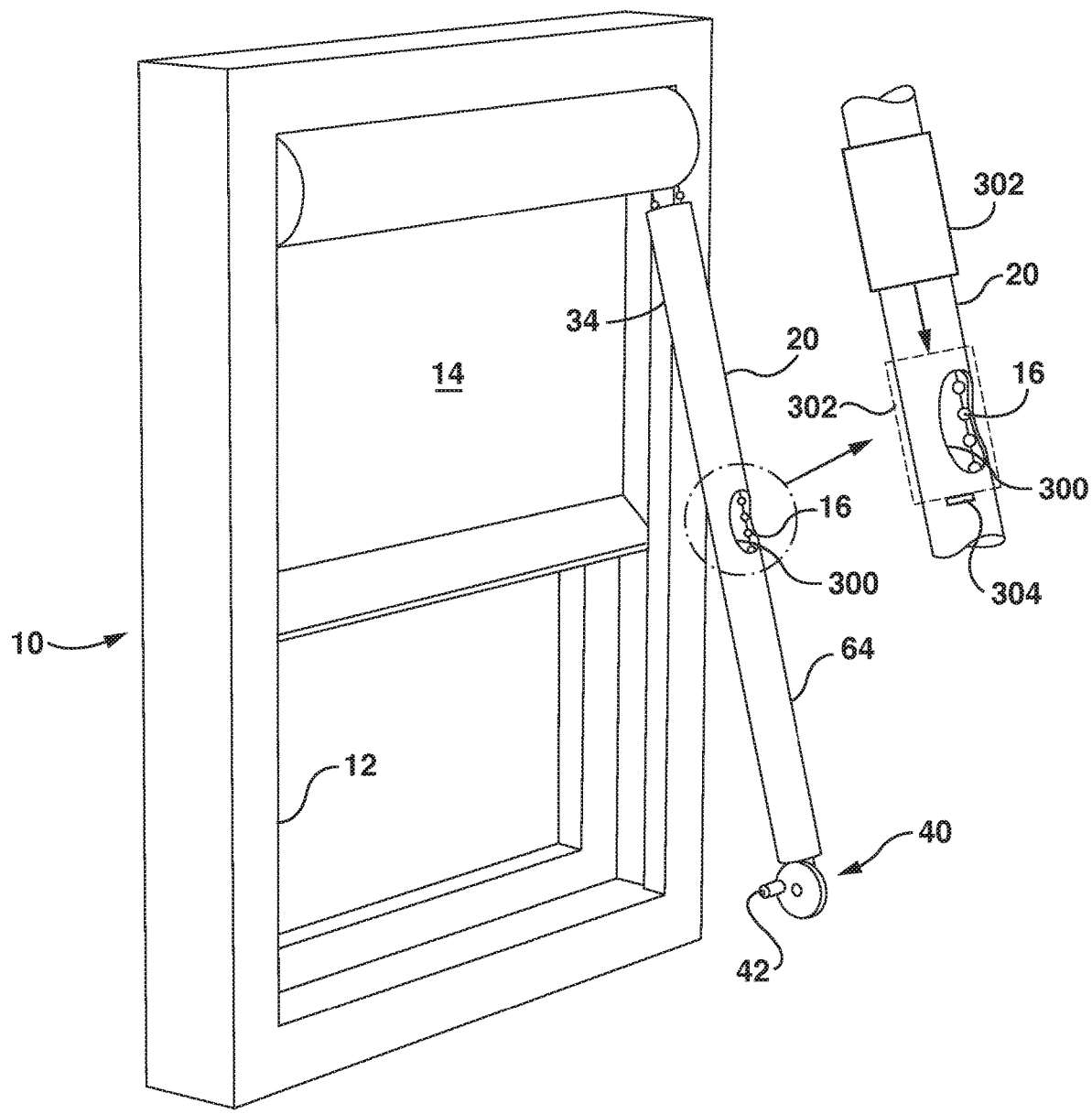
FIG. 29 is a perspective of another embodiment of the invention illustrating the blind control element enclosure with a hole or window into the exterior surface of the enclosure to access the safety blind control element and a closure for the hole.

FIG. 29 illustrates yet another embodiment of the invention which shows an enclosure 20 having an opening 300 into the enclosure 20 to access a portion of the endless loop blind control element. A closure means such as a sliding member cover or sleeve 302 can be incorporated exteriorially of the enclosure 20 so as to permit a sliding sleeve 302 to close the opening 300 in a first position and permitting access to the opening 300 in a second position as shown. The sliding sleeve can be dimensioned to freely slide relative the exterior surface by gravity.

Figure 30:
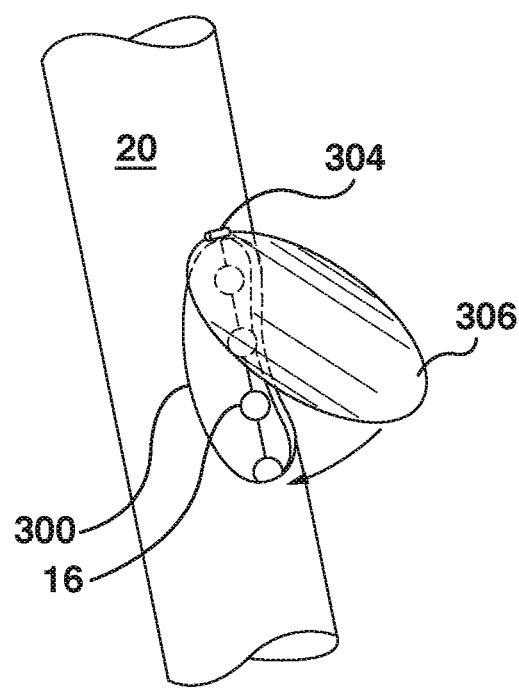
FIG. 30 is another embodiment of FIG. 29 showing a hinged door rather than a sliding sleeve.

In one embodiment, the closure means 300 can comprise a sliding sleeve 302 as shown while a second embodiment as shown at FIG. 30 illustrates that a hinged cover 306 can also be used for the enclosure means. Alternatively the cover 306 can swivel or pivot to allow access to the opening and swing shut by the action of gravity.

Figure 31:
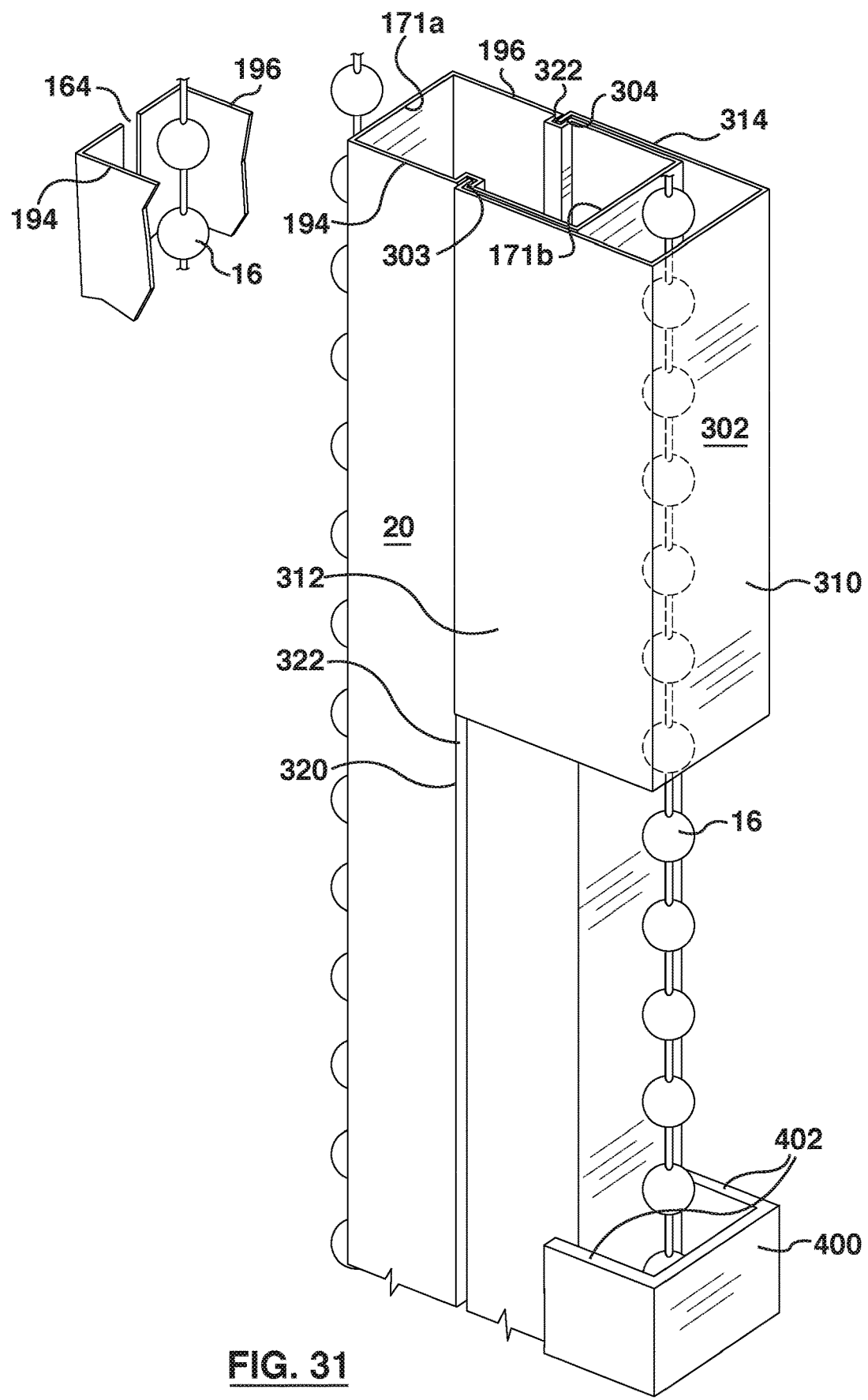
FIG. 31 is a perspective view of another embodiment of the invention showing a sliding member.

FIG. 31 illustrates a further embodiment of the invention showing a portion of the enclosure 20 having spaced sides 194 and 196 and two opposite ends 171a and 171b with two spaced guide means 322 which are adapted to receive the ends 303, 304 of the closure means or sliding member 302 is shown. The closure means or sliding member 302 has one end surface 310 configured to present two spaced substantially parallel side members 312 and 314 which are configured at their ends so as to present ends 303 and 314 that are retained by the guide means 322. The guide means can comprise recesses or slots as shown. The guide means 322 can either extend the full length of the closure 20 or along a portion of the length of closure 20 so as to present a natural stop for the closure means 302. In other words the closure means 302 shown FIG. 31 is adapted to move from a first position (shown in FIG. 31) permitting access to the chain element 16 so as to permit a user to pull on a portion of the chain 16 to either open or close the blind as previously described. Once the blind has been moved to a desired position the closure means 302 will slide to a second position naturally under the force of gravity so as close the access to the chain elements 16. The closure means or cover or slider 302 can be presented on the other side 171a by having its ends 303 and 304 (not shown) retained by the guides 322.

The embodiment shown in FIG. 31 can also include a stopper 400 (attached to the enclosure 20 where the bottom edge of the closure 302 will contact the edges 402 of stopper 400. Other stopper structures 400 could be used.

The longitudinal length of the slider 302 can be dimensional in accordance with the invention, and in one embodiment can be two to three feet long so as to slidingly cover an opening of approximately two to three feet long; all of which will depend on the size of the window.

In other embodiment the slider or cover 302 as shown in FIG. 31 can comprise three pieces namely a top stationary piece and a bottom stationary piece 302 with an opening there between whereby the slider 322 can selectively open and close the opening between two stationary covers or sliders 302. Appropriate stopper can be used.

FIG. 31 also shows a further embodiment of the invention whereby the end 171a of enclosure 20 can include a slot 164 so as to enable a user to locate the element 16 inside the enclosure 20 by manipulating the cord to slide within slot 164 as previously discussed.

The cross section as shown in FIG. 31 illustrates an approximately H shaped hollow cross section although other cross sections such as ovals or any other cross section can be used such as "E" or "I" shaped cross section so long as the ends 303 and 304 of the slider 302 are retained within a guide means 322 as shown.

Figure 32A:
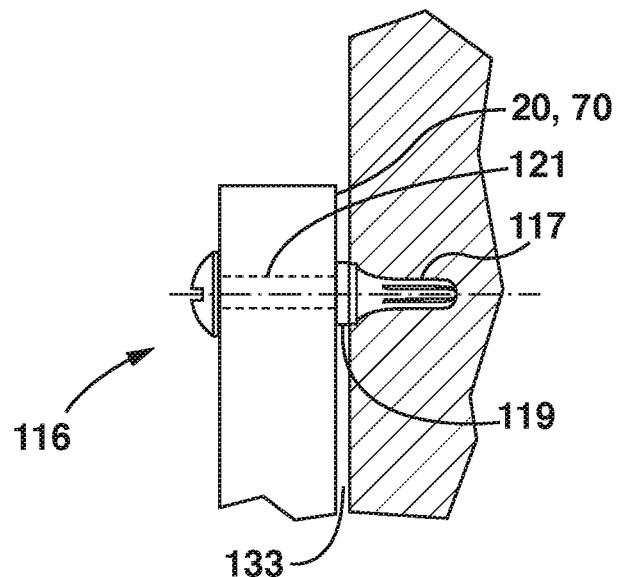

Another embodiment of the invention is shown in FIG. 32a (which is similar to FIG. 17) whereby the fastener or screw 116 passes through a hole 121 through the enclosure 20 or wand 70 through a spacer or washer 119 and into a wall or frame plug 117. The spacer or washer 119 enables the enclosure 20 or wand 70 to be spaced or gapped 133 from the wall or window frame so as to make it easier to grasp the enclosure or wand 70 and manipulate the enclose 20 or wand 70. The hole 121 can in one embodiment be about the same diameter as the diameter of the screw threads 123 so to accommodate the diameter of the screw threads so that the enclosure 20 or wand 70 can pivot about the axis of the screw.

Figure 32B:
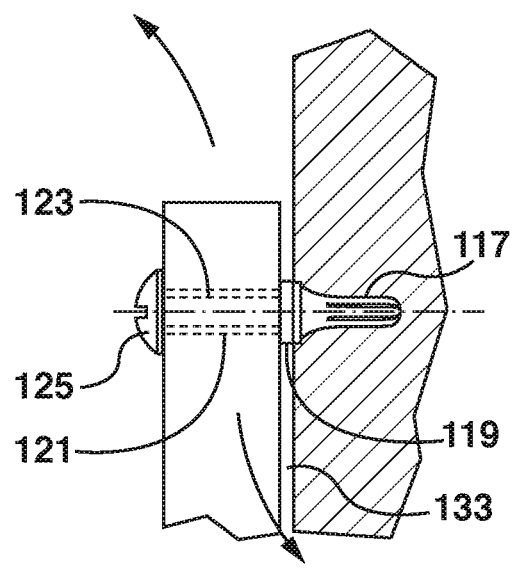
Figure 32C:
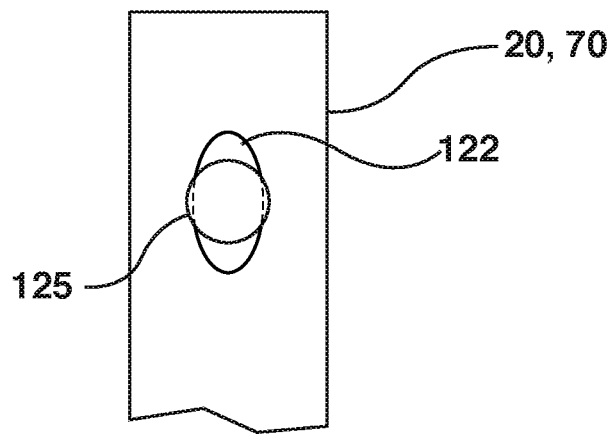

In another embodiment of the invention as shown in FIG. 32b the diameter of the hole 121 is larger than the diameter of the screw threads 123 but smaller than the diameter of the of the fastener head or screw head 125 as shown so that the enclosure or wand can move or pivot smoothly in multiple axis, in other words in 2 as well as 3 directions relative the screw axis. The hole 121 as shown in FIG. 32c can also be oval or oblong in shape so that the enclosure 20 or wand 70 can move continuously or universally in 2 or 3 dimensions relative the axis of the fastener.

Figure 32D:
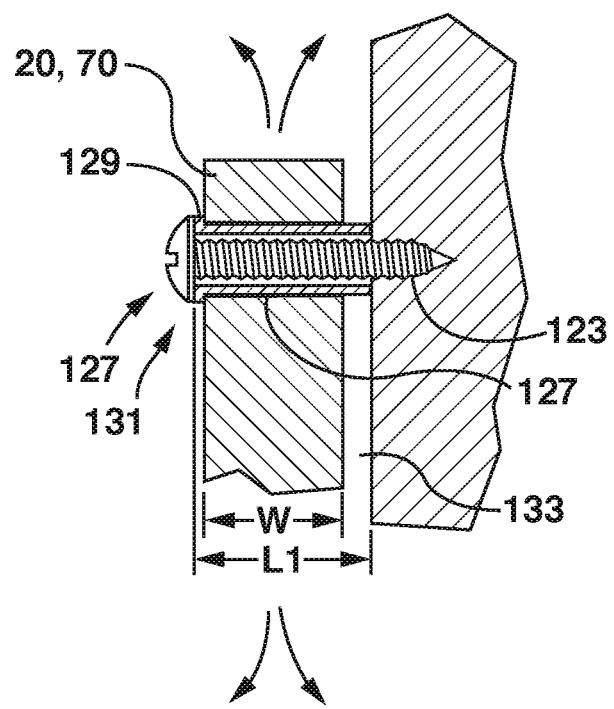

In yet another embodiment of the invention shown in FIG. 32d the enclosure 20 or wand 70 can include a bushing or sleeve 127 which has a flange 129 at one end 131 and another end 133 that will contact the wall or window frame as shown. The length L1 of the bushing or sleeve 127 is slightly longer than the width W of the enclosure 20 or wand 70 so that the there is a space or gap 133 between the enclosure 20 or wand 70 and the wall or window frame. In this embodiment the fastener or screw head 125 is adapted to contact the flange 129 as the screw treads into the dry wall or window frame. The extra length of the bushing or sleeve 127 takes the place of the washer 119 so that the end 131 bears against the dry wall or window frame so as to present the gap or space 133. The diameter of the screw thread 123 in one embodiment is smaller than the diameter of the sleeve 127 so that the enclosure 20 or wand 70 can move universally in 3 dimensions as discussed above.

Figure 32E:
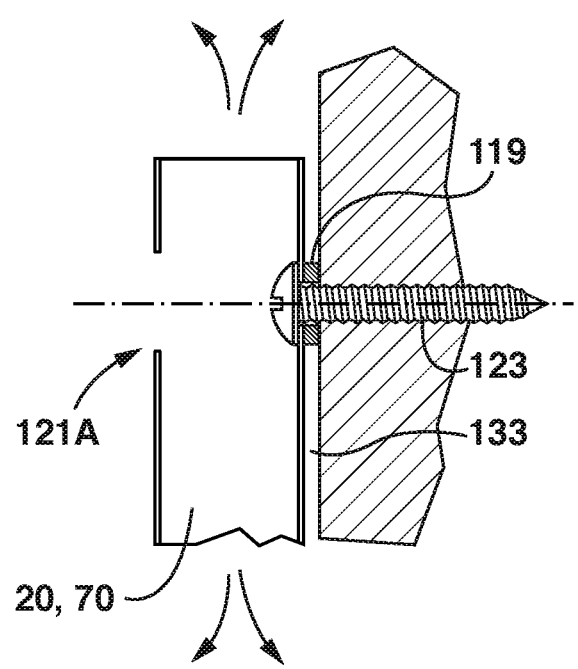

In yet another embodiment of the invention shown in FIG. 32e the hole 121A on one side of the enclosure 20 or wand 70 can be larger so as to permit the entire fastener head 125 to pass there through (since the enclosure 20 or wand 70 is hollow as shown) while a hole 121B on the other side can be of a size so as to permit the screw threads to pass through, but not the fastener or screw head 125; a washer or spacer 17 is used in this embodiment so that there is a sufficient gap 133 as previously described. In one embodiment the gap or space 133 can be 5 millimeters for example.

All of the embodiments of FIGS. 32b-32e illustrate a fastener to permit universal movement in 2 dimensions or about two axis as well as 3 dimensions. There is a built in "play" to permit this universal movement.

The invention is not to be taken as limited to any of the specific features as described, but comprehends all such variations thereof as come within the scope of the appended claims.

What is claimed is:

1. A blind having a blind operating mechanism and an endless loop blind control element for operating the blind operating mechanism, the blind comprising;
   an enclosure extending from an upper end to a lower end, with the endless loop blind control element enclosed within the enclosure between the upper end and the lower end of said enclosure;
   a connector supporting the upper end of the enclosure adjacent to the blind operating mechanism and depending downwardly from the blind operating mechanism;
   said enclosure including an opening into said enclosure between said upper end and said lower end of the enclosure to access the endless loop blind control element to operate the blind operating mechanism;
   displaceable means attached to said enclosure for closing said opening in a closed position to prevent access to said endless loop blind control element.

2. The blind having the blind operating mechanism and the endless loop blind control element as claimed in claim 1 and including a rotatable drive device at the lower end of the enclosure connecting with the endless loop blind control element and capable of operating the endless loop blind control element within the enclosure.

3. The blind having the blind operating mechanism and the endless loop blind control element as claimed in claim 1 wherein said means completely closes said opening in said closed position to prevent access to said endless loop blind control element and permits access to said opening and said endless loop blind control element in an open position.

4. The blind having the blind operating mechanism and the endless loop blind control element as claimed in claim 3 wherein said means comprises a sliding sleeve.

5. The blind having the blind operating mechanism and the endless loop blind control element as claimed in claim 4 wherein said opening comprises an aperature, and said sleeve is disposed on an exterior surface of said enclosure.

6. A blind having a blind operating mechanism and an endless loop blind control element for operating the blind operating mechanism, the blind comprising;
   an enclosure extending from an upper end to a lower end, with the endless loop blind control element enclosed within the enclosure between the upper end and the lower end;
   a connector supporting the upper end of the enclosure adjacent to the blind operating mechanism and depending downwardly from the blind operating mechanism;
   a fastener extending through said enclosure at said upper end of said enclosure to directly fasten said enclosure to a wall or window frame with a gap between said enclosure and said wall or said window frame; and
   wherein said upper end of said enclosure includes a first hole aligned with a second hole, said fastener comprises a screw with a head and includes a sleeve longer than a width of said enclosure extending through said first and second holes for receiving said fastener.

7. A blind having a blind operating mechanism and an endless loop blind control element for operating the blind operating mechanism, the blind comprising;
   an enclosure extending from an upper end to a lower end, with the endless loop blind control element enclosed within the enclosure between, the upper end and the lower end;
   a connector supporting the upper end of the enclosure adjacent to the blind operating mechanism and depending downwardly from the blind operating mechanism and a sprocket disposed at the upper end of the enclosure for engaging the endless loop blind control element; and
   wherein said endless loop blind control element comprises a first loop blind control element and a second loop blind control element and said sprocket for engaging the endless loop blind control element comprises a pair of spaced sprockets where one of said sprockets engages the first loop blind control element and the other sprocket engages the second loop blind control element.

8. The blind having the blind operating mechanism and the endless loop blind control element for operating the blind mechanism as claimed in claim 7 including a plurality of said pair of spaced sprockets along a length of said enclosure.

* * * * *